(12) United States Patent
Maurello

(10) Patent No.: US 11,891,004 B1
(45) Date of Patent: Feb. 6, 2024

(54) VEHICLE PROTECTION ASSEMBLY

(71) Applicant: Rocco Maurello, Chicago, IL (US)

(72) Inventor: Rocco Maurello, Chicago, IL (US)

(*) Notice: Subject to any disclaimer, the term of this patent is extended or adjusted under 35 U.S.C. 154(b) by 0 days.

(21) Appl. No.: 18/182,313

(22) Filed: Mar. 10, 2023

(51) Int. Cl.
  *B60R 19/56* (2006.01)
  *B60R 19/40* (2006.01)

(52) U.S. Cl.
  CPC ............ *B60R 19/565* (2013.01); *B60R 19/40* (2013.01)

(58) Field of Classification Search
  USPC ............................................ 293/142, 26, 118
  See application file for complete search history.

(56) References Cited

U.S. PATENT DOCUMENTS

| | | | |
|---|---|---|---|
| 3,718,357 A | 2/1973 | Hertzell | |
| 4,437,697 A * | 3/1984 | Hinojos | B60R 13/04 293/118 |
| 4,648,644 A * | 3/1987 | Swanson | B60R 13/04 293/118 |
| 5,518,283 A | 5/1996 | Egelske | |
| 6,893,079 B1 * | 5/2005 | Johnson | B60R 19/42 296/187.03 |
| 7,210,718 B1 * | 5/2007 | Budhu | B60R 19/38 293/114 |
| 7,354,083 B1 * | 4/2008 | Obermann | B60R 19/565 293/126 |
| 8,702,136 B2 | 4/2014 | Azhagesan | |
| 10,906,488 B2 * | 2/2021 | Santiago | B60R 19/42 |

* cited by examiner

*Primary Examiner* — Joseph D. Pape
(74) *Attorney, Agent, or Firm* — Greenberg Traurig; Tanzina Chowdhury

(57) ABSTRACT

Vehicle side protector is disclosed. The vehicle external side protector vehicle external side protector has at least two 2-piece vertically moveable guards of a height from bottom of wheel to desired height up the vehicle and a connecting guard stretching from the first to the second vertically moveable guard. The 2-pieces of a vertically moveable guard are connected by a lever; and the length of the vehicle external side protector is less than the distance from the outer perimeter of a front wheel to the outer perimeter of a back wheel of a vehicle side to deploy and retract from underneath the vehicle and be stored underneath the vehicle in parallel plane to the vehicle's undercarriage. The vehicle external side protector rests on a track with an end point block; and connected to an actuator. Also disclosed are vehicle external front and back protectors.

20 Claims, 18 Drawing Sheets

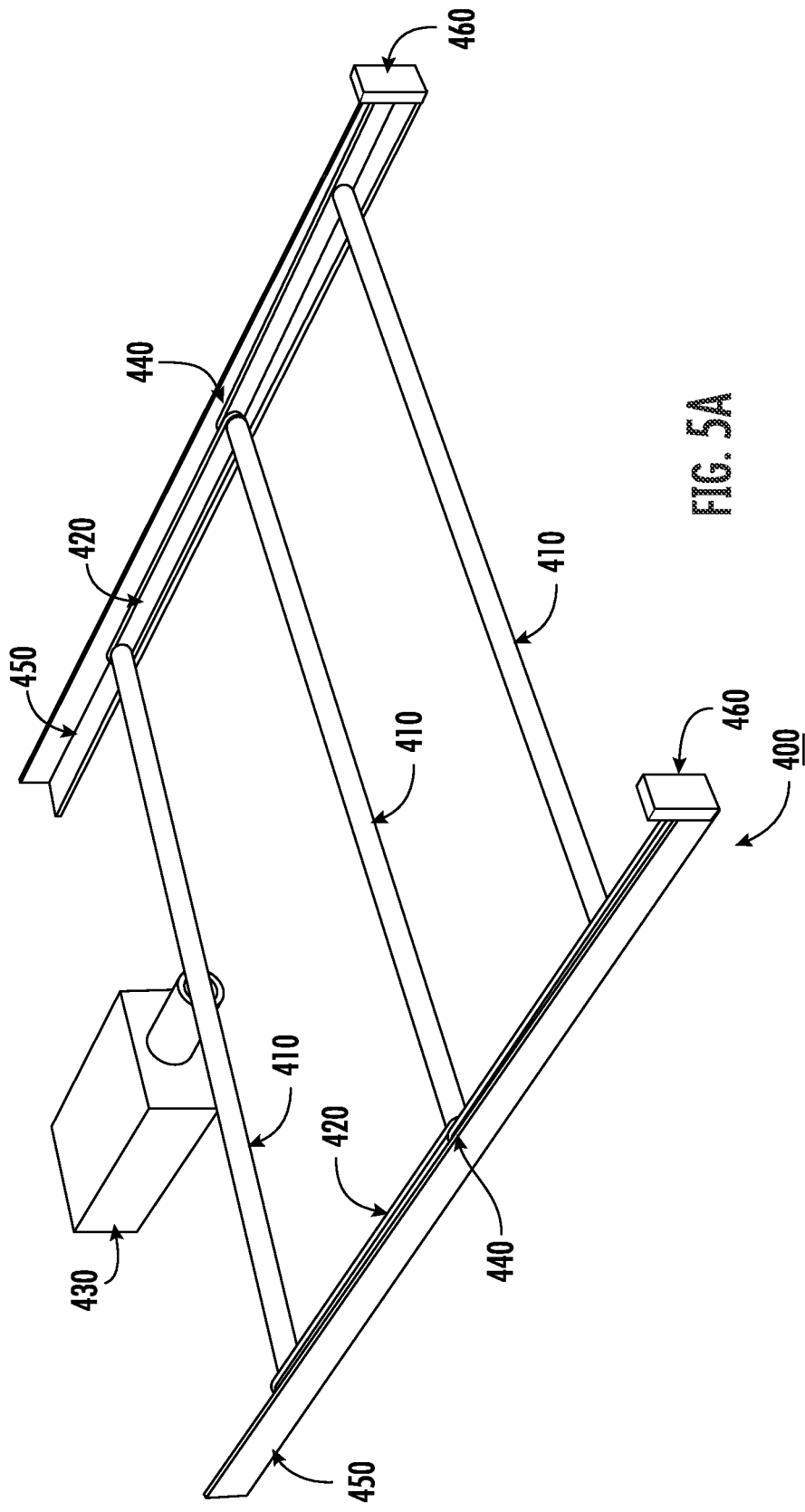

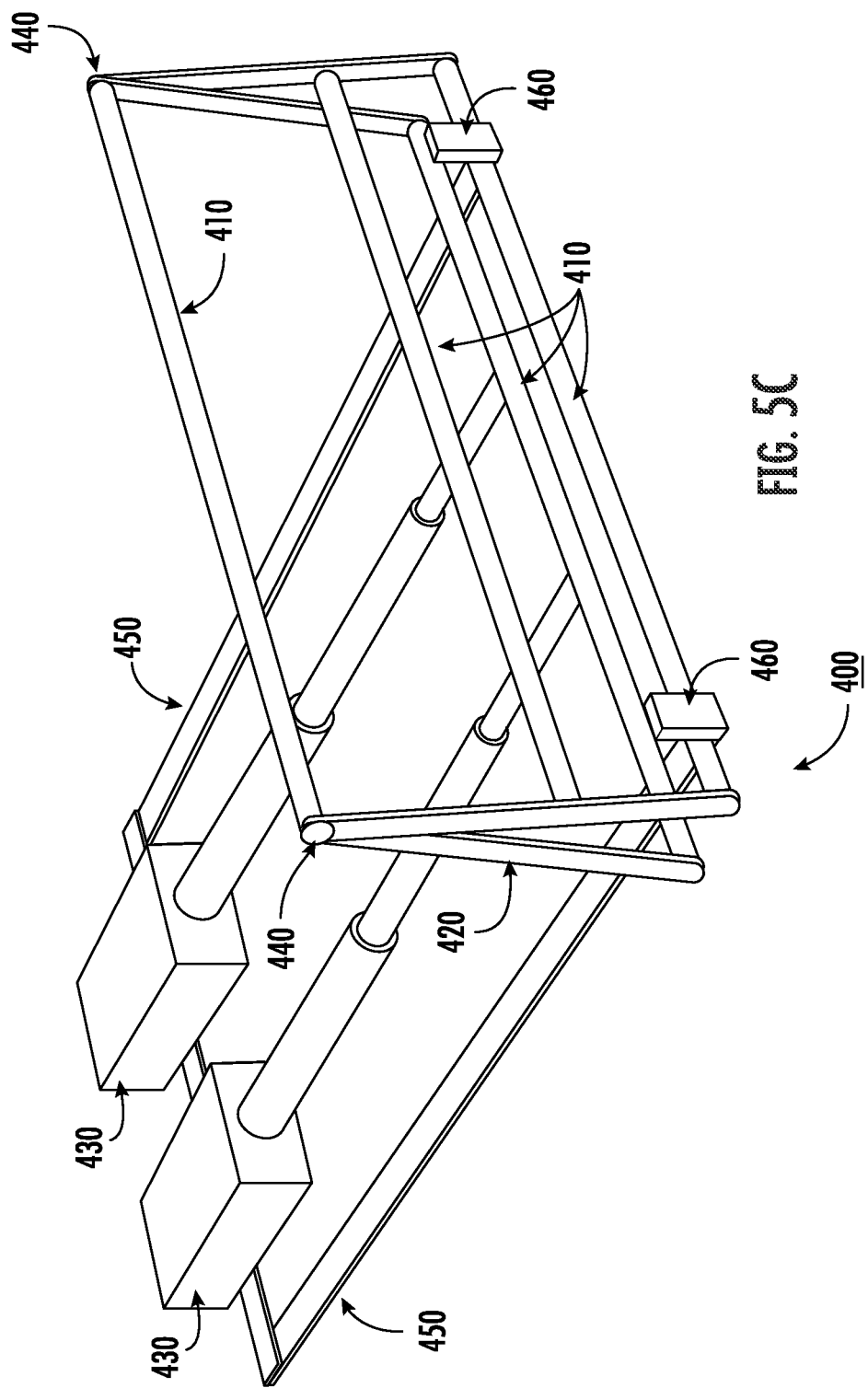

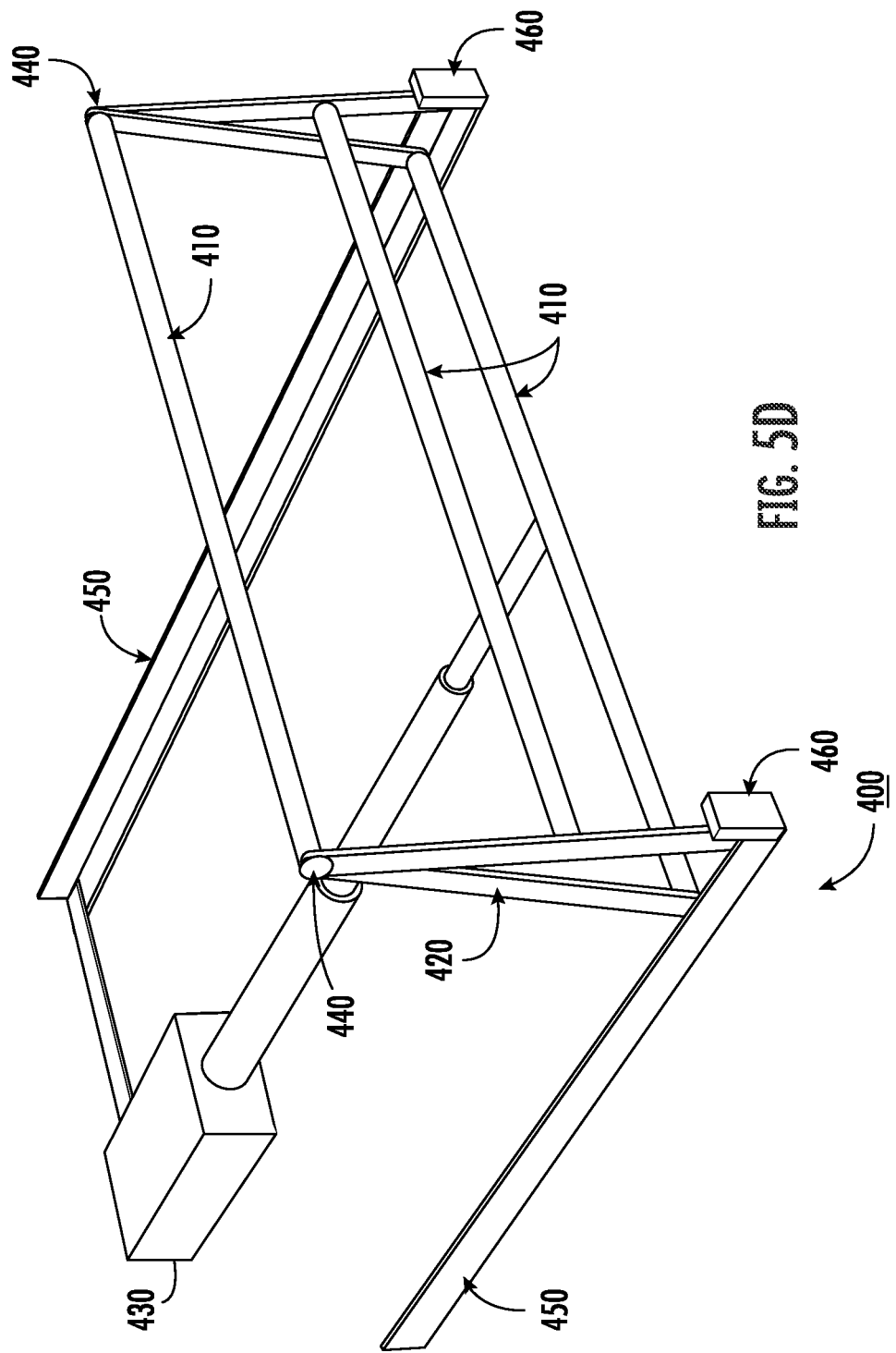

FIG. 15     800

VEHICLE PROTECTION ASSEMBLY

FIELD OF THE INVENTION

This invention includes embodiments of apparatuses for protecting the sides, front and back of vehicles and methods of making and using such. Particularly, the invention includes embodiments of apparatuses for protecting the sides, front and back from scratches, dents, or other damage caused by contact or impact with adjacent automobile doors, shopping carts, other objects such as pillars and walls.

BACKGROUND OF THE INVENTION

A vehicle such as an automobile is often the most expensive purchase a person makes during his or her lifetime. But the automobile in day-to-day use is prone to damage from surroundings all around the perimeter: the sides, front, and back of vehicles.

Oftentimes, a parked vehicle is susceptible to dings, dents, scratches, etc. when opening one's own vehicle door or adjacent vehicle door. For example: when a vehicle occupant, whether own's vehicle or adjacent vehicle occupant, opens and closes the vehicle door to get in or out of the parked vehicle, the vehicle door comes into contact with other vehicles parked nearby, shopping carts or other objects such as pillars and walls, thereby scratching, denting, nicking, or damaging the adjacent vehicles or one's own vehicle. The longer a vehicle is parked in a public parking lot having a high amount of traffic, a ding, dent, scratch, etc. is caused by a vehicle door opening contact with another parked vehicle or object is more imminent. Consequently, most vehicle occupants cannot comfortably open the door of parked vehicle and have to narrowly carefully open the door and squeeze in and out of the vehicle to avoid contact with surrounding vehicles or objects. Furthermore, when parking a vehicle in a tight spot or getting out of a tight parking spot, the vehicle's front or back (or side) might come into contact with other adjacent vehicles in all perimeters from front, back, or side or other objects such as carts, pillars and walls, thereby damaging the front, bumper, or sides of adjacent vehicles or to one's own vehicle.

Conventional technology and methods exist to try to avoid or minimize such damage but have disadvantages. Some conventional door guards such as Azhagesan's U.S. Pat. No. 8,702,136, which hereby incorporated by reference in its entirety, have disadvantages of requiring manual attachment and removal of the door guards and just protect the door and fail to protect the front and back of vehicles. Such conventional door guards are or must be manually attached to a portion of the door to be first contacted with other vehicles or objects within the turning radius of the vehicle door when opening or closing. Furthermore, some conventional attached or attachable door guard only prevent some damage when opening or closing own vehicle door collides with an adjacent vehicle or a wall/pillar. But, after parking own vehicle, door nicks or dents caused by when occupant of a subsequently adjacently parked vehicle, which was not present when parking own vehicle, opens or closes the door cannot be prevented i.e. when a subsequent adjacent vehicle occupant or object, which was not present before when parking own vehicle, parks and opens or closes the door(s), such damage cannot be avoided because vehicle owner cannot control the distance between a subsequently parked car or subsequently placed shopping cart or other objects. Even when car manufacturers and/or automobile dealers attach the protective guards on the vehicles, the door guards are usually narrow and generally extend less than one inch outward from the surface of the side or door panel. Further, the variety of shapes, heights and sizes of doors for various vehicles of respectively one's own vehicle and adjacent vehicle do not necessarily correspond; and therefore oftentimes fail to stop contact.

Hertzell's U.S. Pat. No. 3,718,357, which is hereby incorporated by reference its entirety, provides deployable and retractable hinged baseboard attached to the underside of the vehicle and does not require manual attachment and removal. But, Hertzell hinged baseboard has disadvantages and only protects certain areas of the vehicle such as the lower surface of the door frame. Hertzell fails to provide any protection to the upper portion of the doors or quarter panels that need it most, and that on most vehicles, tend to extend outwardly the furthest and most vulnerable to dings and dents. In addition, many modern vans, sport utility vehicles (SUVs) and four-wheel drive vehicles are substantially higher than the average passenger sedan or coupe; and therefore, the doors of such higher vehicles would clear the top edge of such a design, and therefore could damage the door or side panels of a typical passenger vehicle. Additionally, U.S. Pat. No. 3,718,357 fails to simultaneously protect side, the front and back of vehicles.

Egelske's U.S. Pat. No. 5,518,283, which is hereby incorporated by reference in its entirety, provides a protective apparatus with an elongated bar rotatably mounted within the wheel wells and driven by both a mechanical and an electrical connection to the vehicle's drive shaft, and also has several disadvantages. Egelske's apparatus provides protection only for that portion of the vehicle between the innermost edges of the vehicle's wheel wells; Egelske's apparatus may be a potential operational hazard to the vehicle as a threat to the vehicle's tires integrity during radical maneuvering or to the drive system of the vehicle through its direct connection thereto. Furthermore, these designs above are likely to interfere with the jack points on a typical modern vehicle, which are often located just inside of the front and rear tire wells.

Obermann's U.S. Pat. No. 7,354,083 protective apparatus of a tension cable that blocks objects that may inadvertently approach and dent the vehicle is deployable and retractable; but still has disadvantages. The tension cable is of limited strength and cannot block or stop heavy objects; and tension cable is also very narrow and only provides protection for surface area equal to the narrow width of the cable and leaves most door surface area vulnerable.

Consequently, vehicle protectors providing protection for sides, front, and back of vehicles for various size and types of vehicles for more surface area than narrow width of the cable or rope and also remotely deployable and retractable are still needed. Also needed are vehicle protection apparatus capable of blocking or stopping contact with heavy objects of more strength than a tension cable. Exemplary conventional vehicle protectors are provided in FIGS. 1 and 2.

BRIEF SUMMARY OF THE INVENTION

The present invention meets these and other needs by providing protection around a vehicle such as with a vehicle external side protector, vehicle external front protector, vehicle external back protector, and vehicle protection system. Accordingly, one aspect of the invention provides a vehicle external side protector. The vehicle external side protector has at least two 2-piece vertically moveable guards of a height from bottom of wheel to desired height up the vehicle and a connecting guard stretching from the first to the second vertically moveable guard. The 2-pieces of a vertically moveable guard may be connected by a lever; and the length of the vehicle external side protector may be less than the distance from the outer perimeter of a front wheel to the outer perimeter of a back wheel of a vehicle side. These configurations may allow the protector to deploy and retract from underneath the vehicle and be stored underneath the vehicle in parallel plane to the vehicle's undercarriage. The vehicle external side protector typically rests on a track with an end point block; and connected to an actuator to help effect deployment between storage and protection modes.

A second aspect of the invention provides a vehicle external side protector. The vehicle external side protector may have at least two 2-piece vertically moveable guards of a height from bottom of wheel to desired height up the vehicle; and the 2-pieces of a vertically moveable guard are connected by a lever. A connecting guard typically stretches from the first to the last vertically moveable guard.

The vehicle external side protector may rest on a track and be stored underneath the vehicle (e.g., in parallel plane or substantially parallel plane such as at an angle of 5° to the vehicle's undercarriage); and may have a length less than the minimum distance from the outer perimeter of a front wheel to the outer perimeter of back wheel of a vehicle side to deploy and retract from underneath the vehicle. An actuator affixed to the connecting guard may horizontally deploy the vehicle external side protector from underneath the vehicle along the track pushing towards an endpoint block; and the levers connecting the 2 piece vertically moveable guards fold up the 2-piece vertically moveable guards in an upward direction from bottom of the vehicle toward the vehicle top up to desired length. A signal transmitted to the actuator may reversibly fold down the 2 piece-lever connected vertically moveable guards from the vehicle top towards the bottom until back to horizontal; and the horizontal vehicle external side protector retracts to underneath the vehicle in parallel plane to the vehicle's undercarriage.

A third aspect of the invention provides a vehicle protector which may be used on the front, back, or side of the vehicle. A vehicle front or back protector comprises: a linear force applicator having a housing, and piston in the housing attached to the linear force applicator, wherein the linear force applicator is configured to linearly move the piston; and a plate. The plate has a larger outer surface perimeter than the outermost surface perimeter of the piston, wherein the plate is affixed to the portion of the piston furthest from the linear force applicator. The linear force applicator (e.g., actuator) moves the piston to extend the plate a distance away from the bumper or front and retracts the piston and plate to the opening; and the front or back vehicle protector is capable of being connected to a vehicle's front or back.

Similarly, a vehicle external back protector is provided, where the orifice is placed onto the backside of the vehicle such as in the vehicles rear bumper. The vehicle external back protector includes a back of the vehicle having at least an orifice. The orifice may be dimensioned to include an actuator having a housing, and a piston in the housing. A metal plate with a larger outer surface perimeter than the outermost surface perimeter of the piston is typically affixed to the external outermost surface perimeter of the piston; wherein the actuator deploys the piston and retracts the piston up to the metal plate which remains outside of the orifice.

A fifth aspect of the invention provides a vehicle external protection system. The vehicle external protection system includes a vehicle external side protector, vehicle external front protector, and vehicle external back protector. In some embodiments, the system comprises two side protectors, such that a protector may be deployed on each side of the vehicle. The accompanying figures, which are incorporated in and constitute part of this specification, are included to illustrate and provide a further understanding of the method and system of the invention. Together with the description, the figures explain the principles of the invention. It is contemplated that features from one embodiment may be beneficially incorporated in other embodiments without further recitation.

BRIEF DESCRIPTION OF THE DRAWINGS

FIG. 5A is a view of a vehicle external side protector in storage position in accordance with an embodiment of the invention.

FIG. 5C is another view of a vehicle external side protector in deployed position in accordance with an embodiment of the invention.

FIG. 5D is another view of a vehicle external side protector in accordance with an embodiment of the invention.

To facilitate understanding, identical reference numerals have been used, wherever possible, to designate identical elements that are common to the figures. However, identical reference numerals in different figures may be considered separate and distinct embodiments.

DETAILED DESCRIPTION

Figure 1:
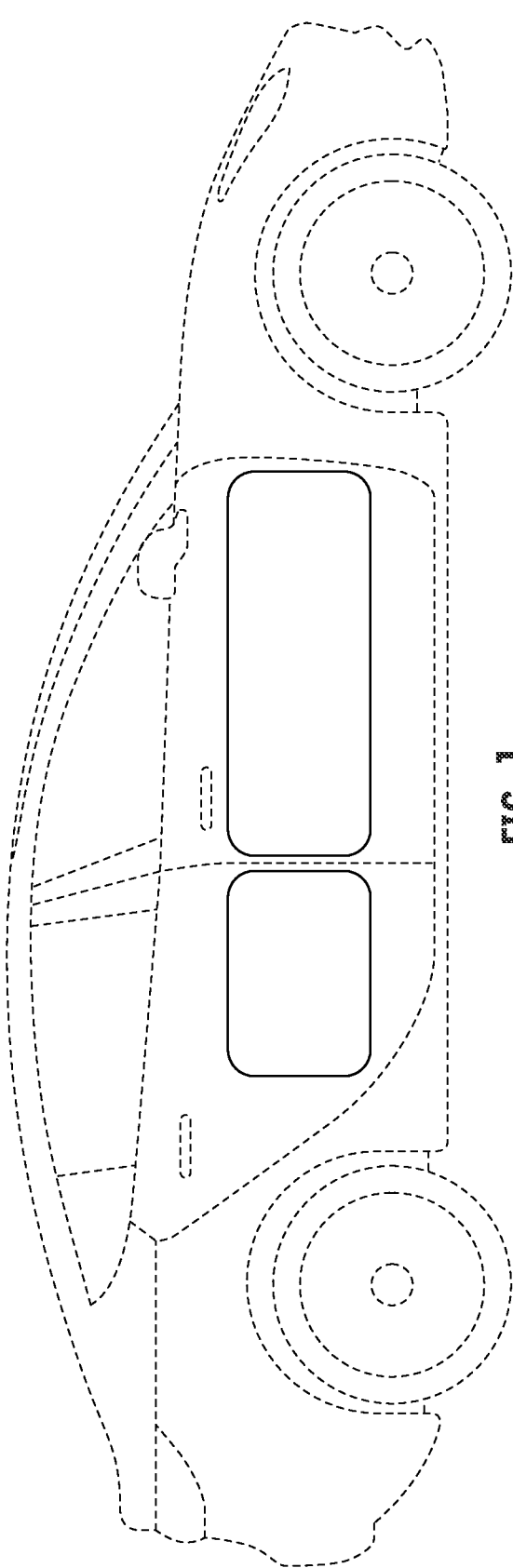
FIG. 1 is a schematic of a conventional a manual vehicle side protector.

In the following description, it is understood that terms such as "top," "bottom," "outward," "inward," and the like are words of convenience and are not to be construed as limiting terms. Reference will now be made in detail to exemplary embodiments of the invention, which are illustrated in the accompanying figures and examples. Referring to the drawings in general, it will be understood that the illustrations are for the purpose of describing a particular embodiment of the invention and are not intended to limit the invention thereto.

Whenever a particular embodiment of the invention is said to comprise or consist of at least one element of a group and combinations thereof, it is understood that the embodiment may comprise or consist of any of the elements of the group, either individually or in combination with any of the other elements of that group.

In some embodiments, the vehicle external side protector may comprise:
- at least two vertically moveable guards comprising two pieces capable of pivoting and/or bending between the two pieces;
- a lever connecting the 2-pieces of the vertically moveable guard at the pivot and/or bend;
- a connecting guard connecting at least two of the at least two 2-piece vertically moveable guards;
- a track for each 2-piece vertically moveable guard dimensioned to be stored underneath a vehicle and able to slide out from underneath the vehicle, wherein the track comprises an endpoint guard;
- a linear force applicator configured to apply a force, directly or indirectly, to at least one of the 2-piece vertically moveable guards in the track, wherein the force deploys the vehicle external side protector from underneath the vehicle along the track by pushing the at least one of the 2-piece vertically moveable guards in the track towards and into the endpoint block, wherein the force from the endpoint block on the 2-piece vertical guard causes the at least one of the 2-piece vertically moveable guards to upwardly fold up the at least one 2-piece vertically moveable guard from bottom of the vehicle toward the vehicle top into a protective configuration;

wherein the linear force applicator may also apply a force, directly or indirectly, in the opposite direction of the force to one of the 2 vertically moveable guards to fold down the 2-piece vertical guard from the protective position until the 2-piece vertical guard is back in the track in a horizontal position; and/or the horizontal vehicle external side protector retracts to underneath the vehicle in parallel plane to the vehicle's undercarriage in a storage configuration.

Figure 4:
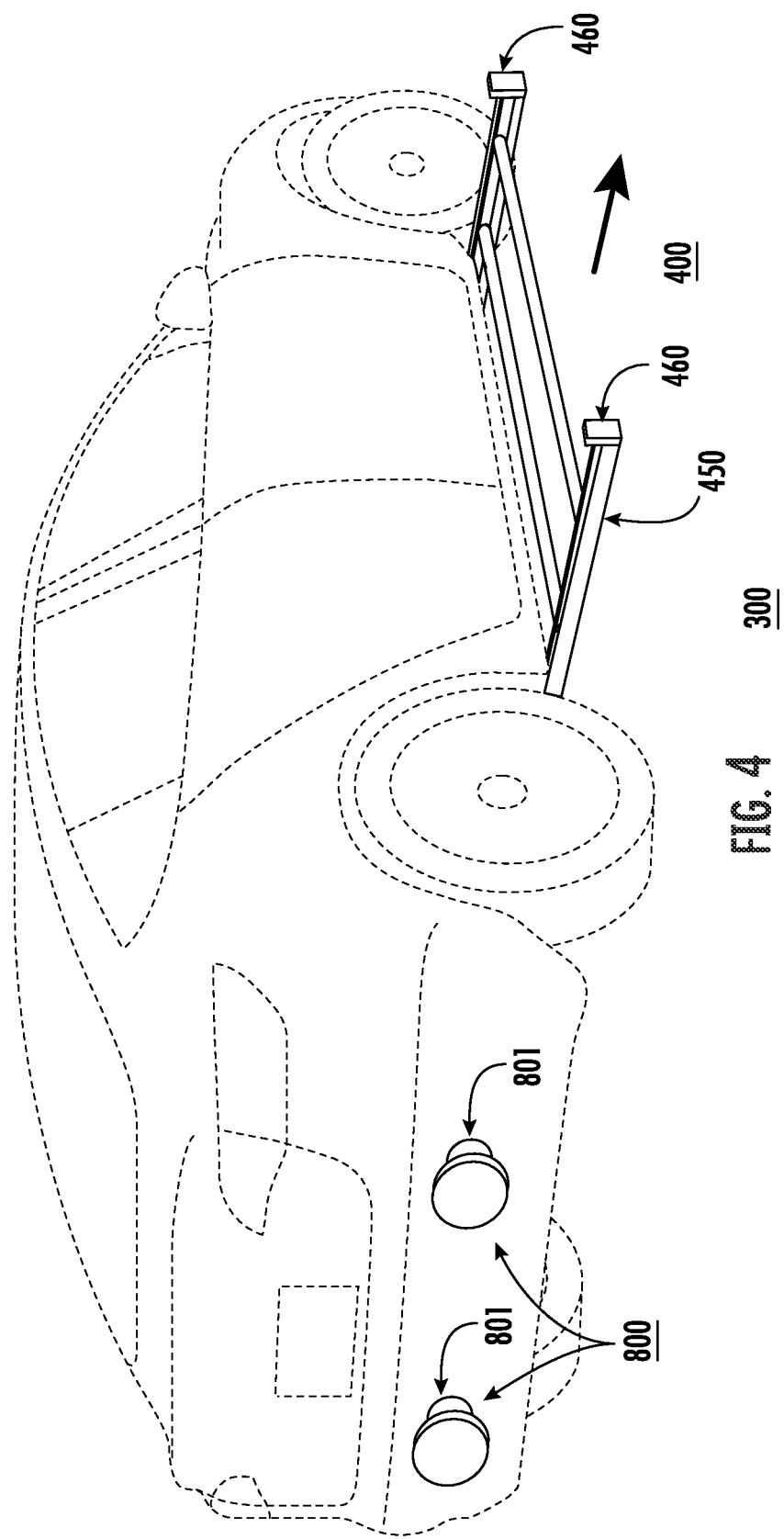
FIG. 4 is a perspective view of a deploying vehicle external side protector in accordance with an embodiment of the invention.
Figure 5B:
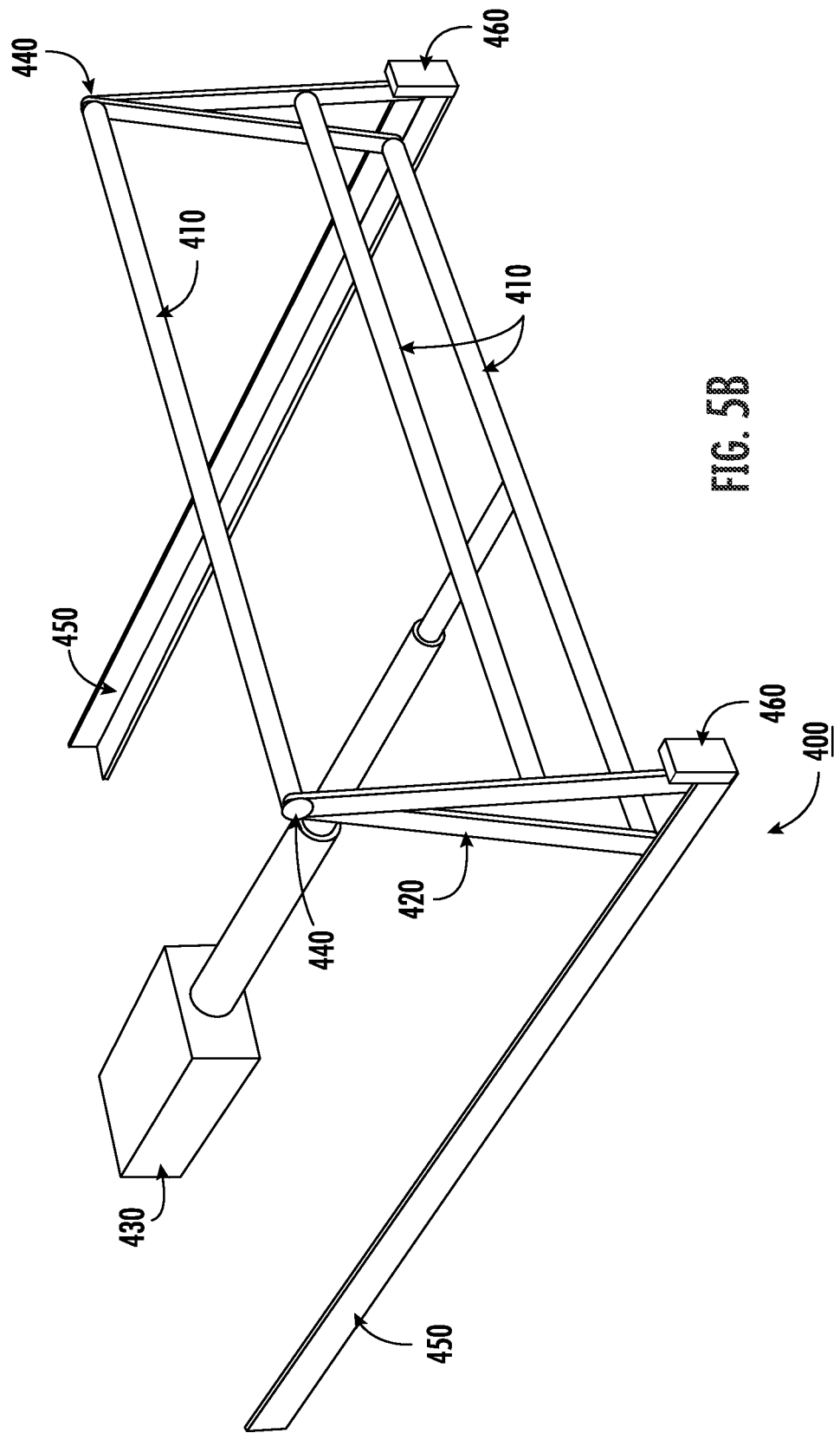
FIG. 5B is a view of a vehicle external side protector in deployed position in accordance with an embodiment of the invention with FIG. 5A and FIG. 5B showing from closed (storage) position to the open (deployed) positions.
Figure 5E:
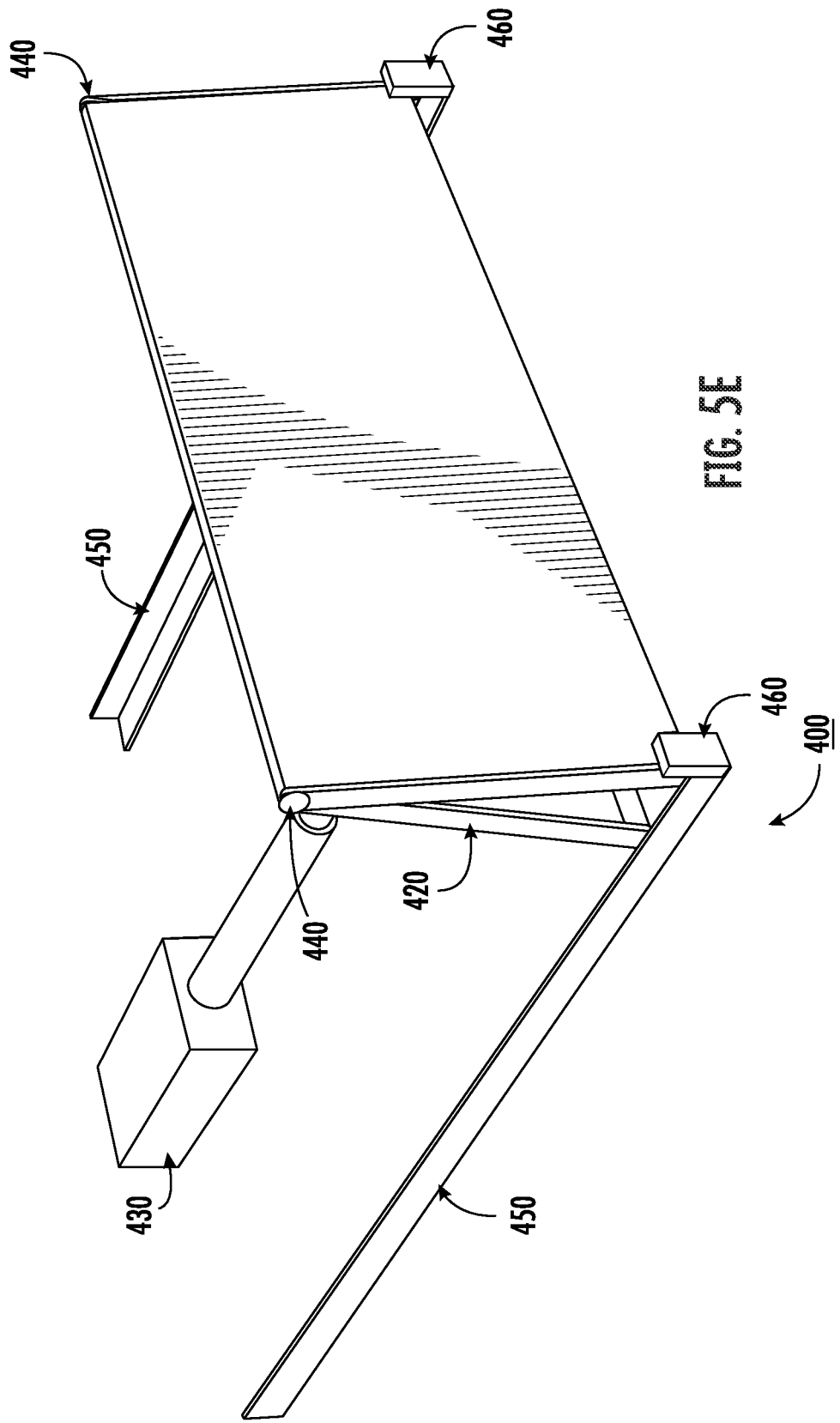
FIG. 5E is another view of a vehicle external side protector in accordance with an embodiment of the invention.
Figure 5F:
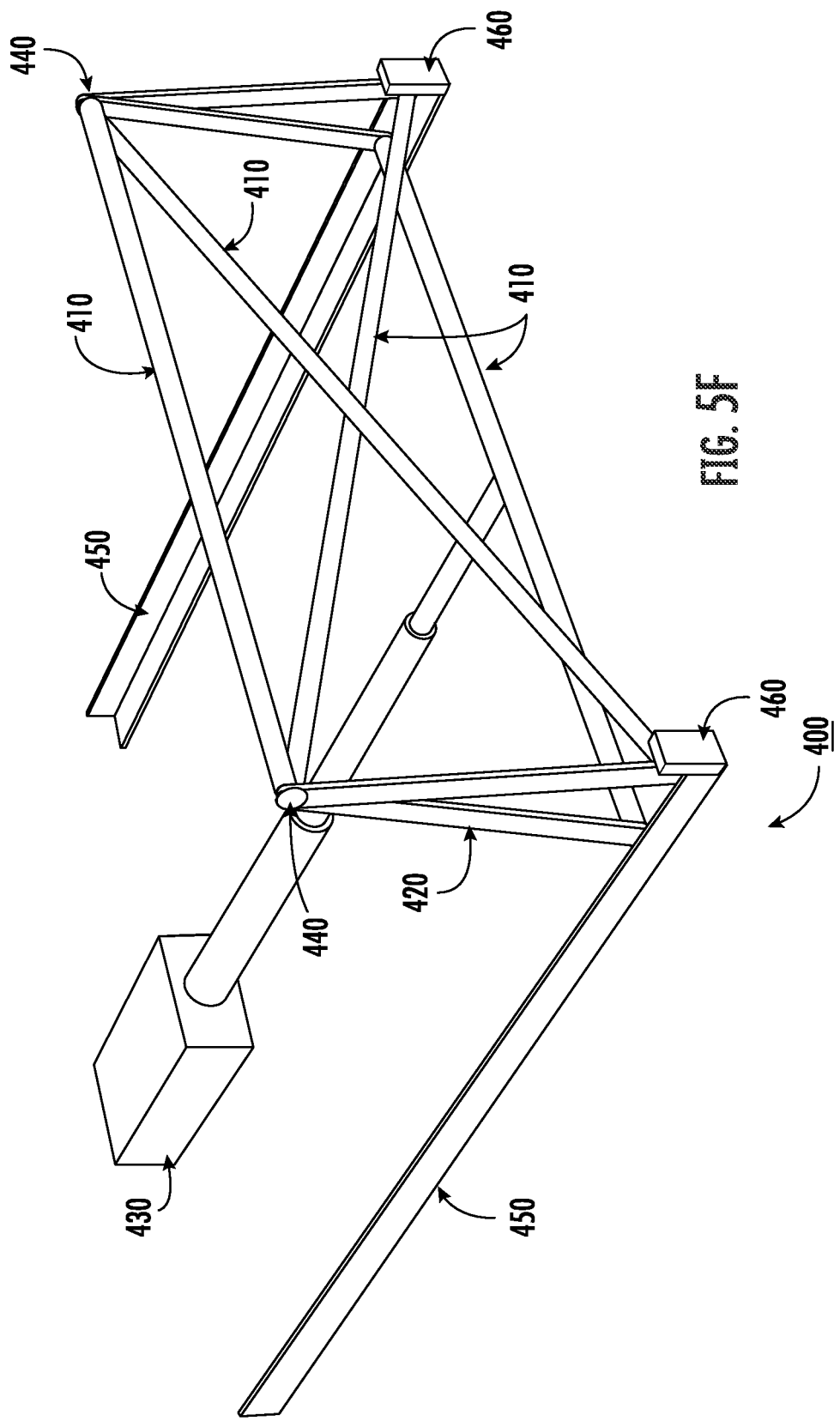
FIG. 5F is another view of a vehicle external side protector in accordance with an embodiment of the invention.
Figure 6:
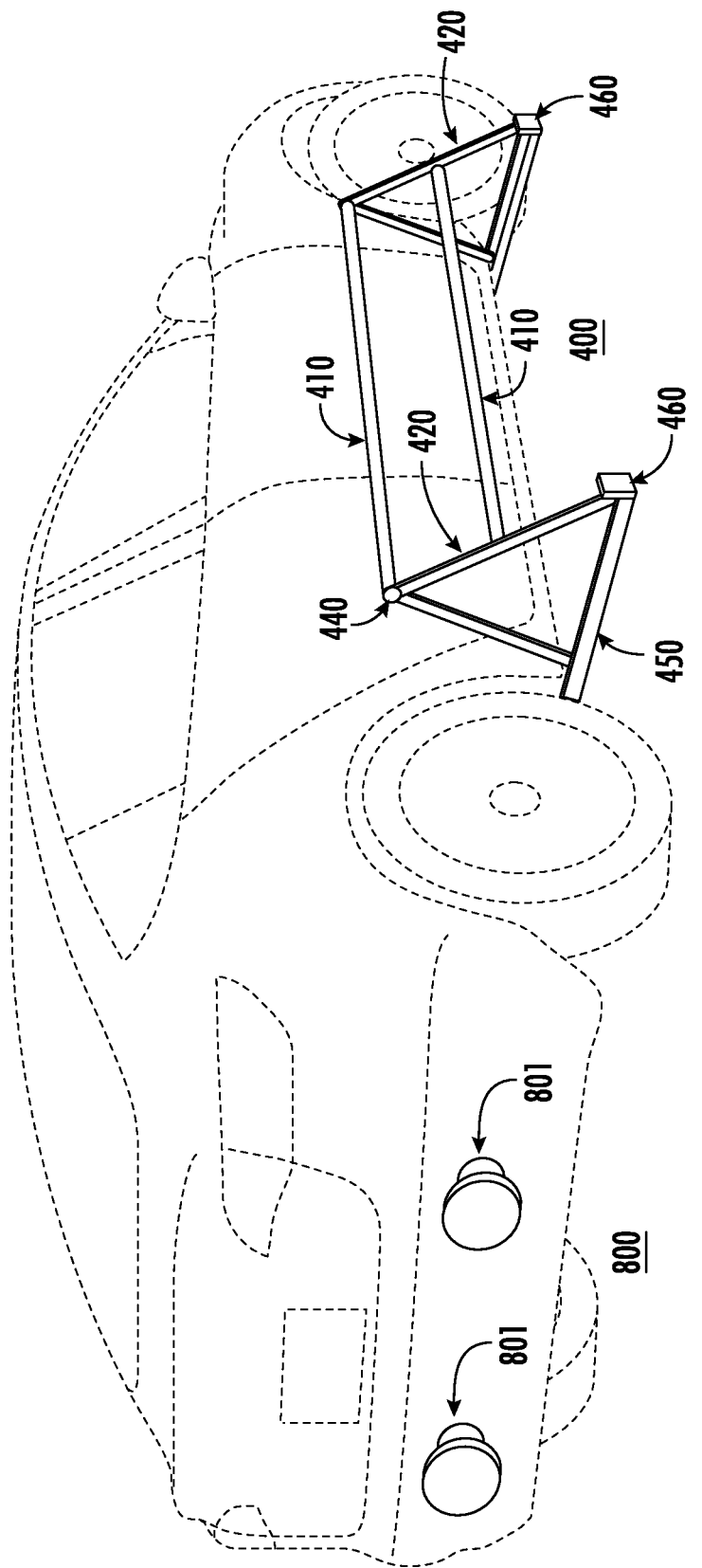
FIG. 6 is perspective view of a vehicle external side protector in accordance with an embodiment of the invention.
Figure 7:
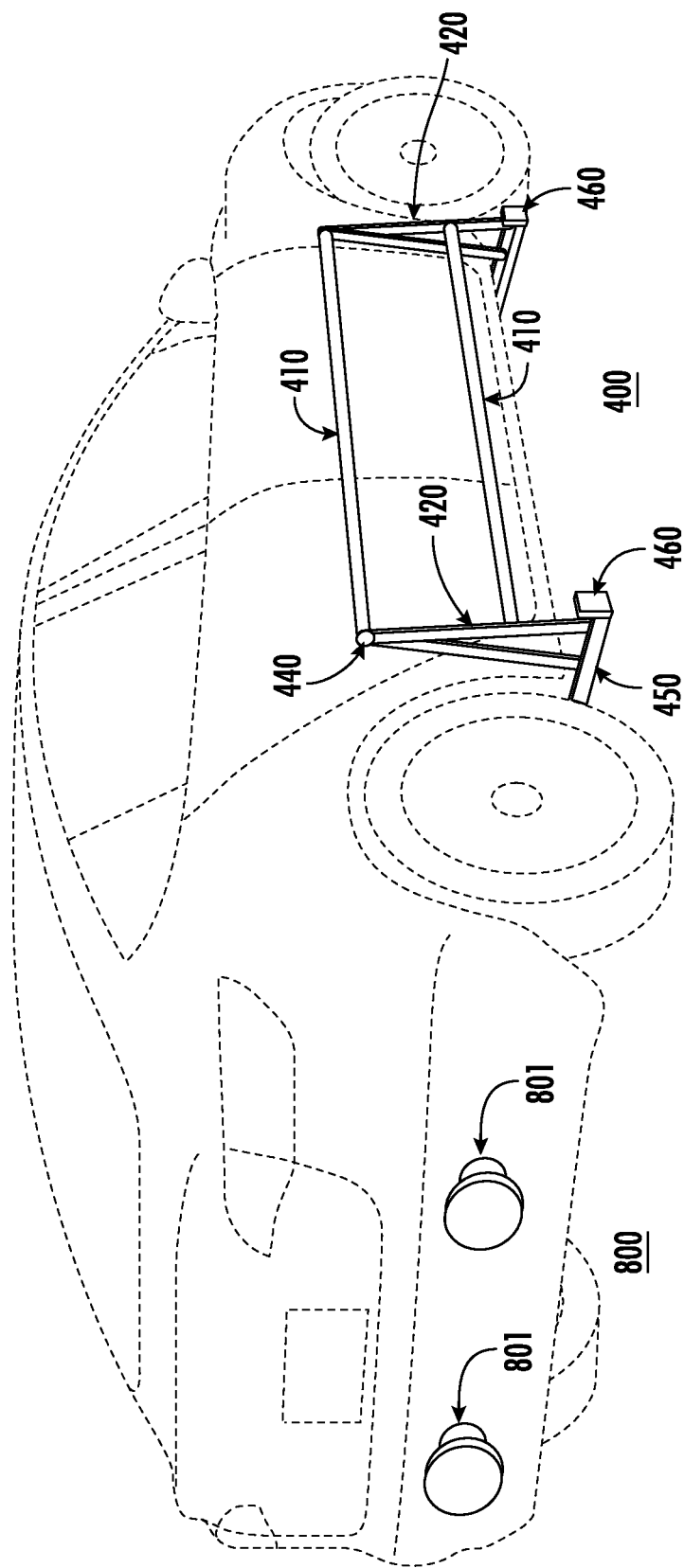
FIG. 7 is another perspective view of a vehicle external side protector and rear protectors in accordance with an embodiment of the invention.
Figure 8:
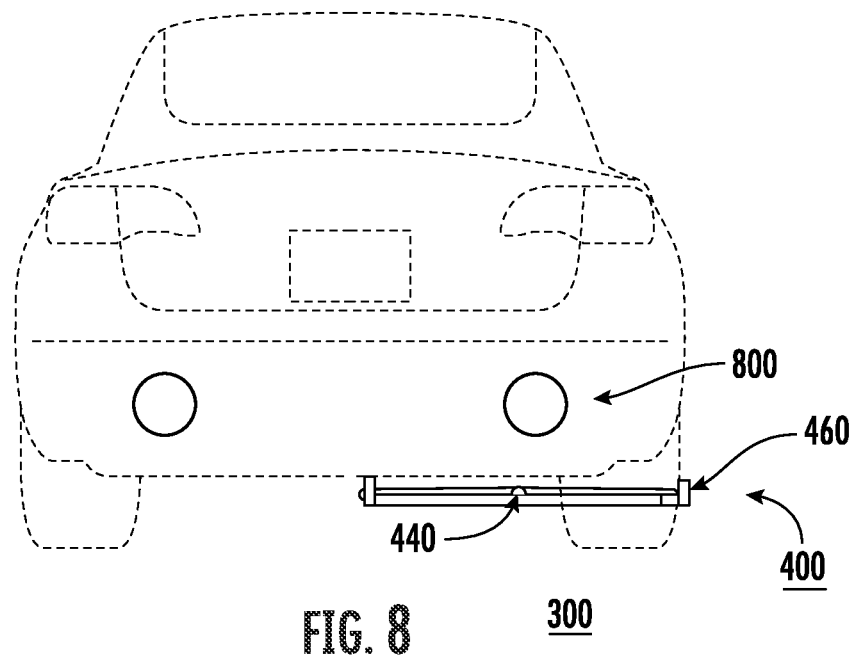
FIG. 8 is a rear view of a retracted vehicle external side, front and back protector in accordance with an embodiment of the invention.
Figure 9:
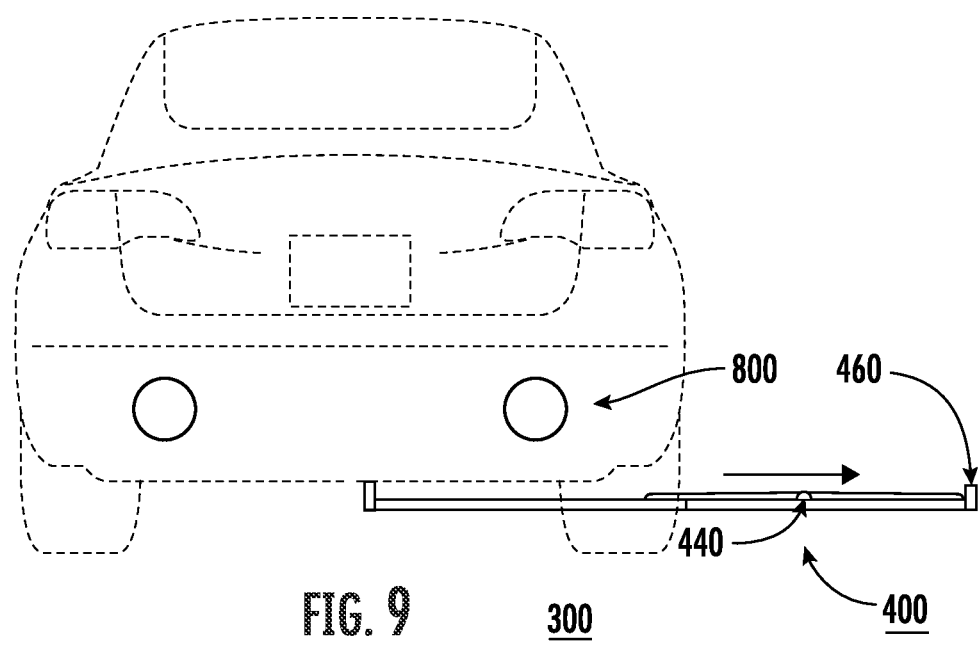
FIG. 9 is a rear view of a vehicle external side protector in accordance with an embodiment of the invention at a point during guard deployment.
Figure 10:
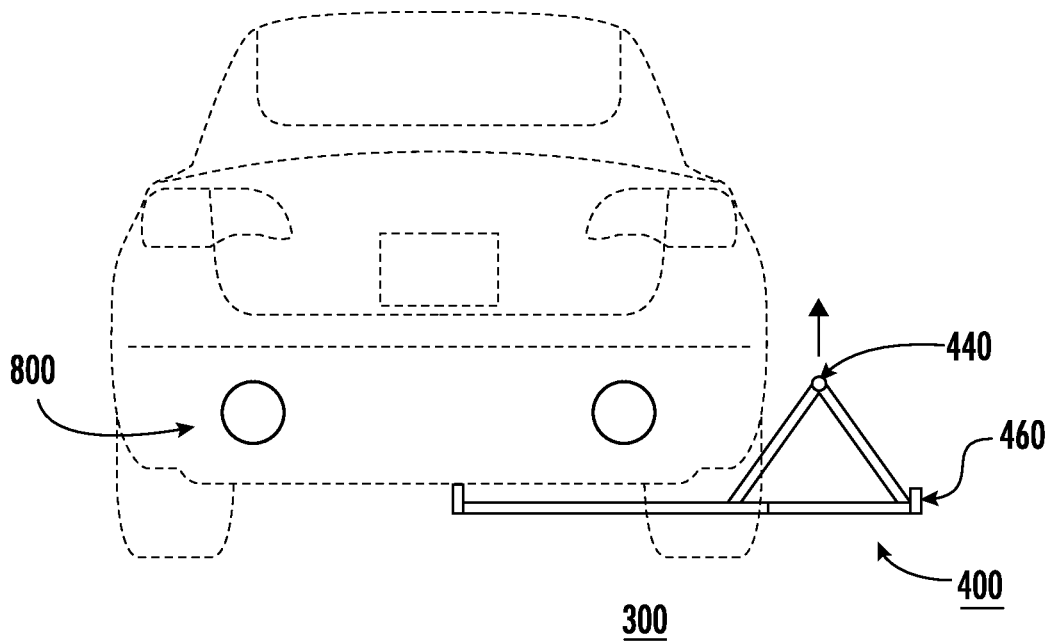
FIG. 10 is another rear view of a vehicle external side protector in accordance with an embodiment of the invention at a point during guard deployment.
Figure 11:
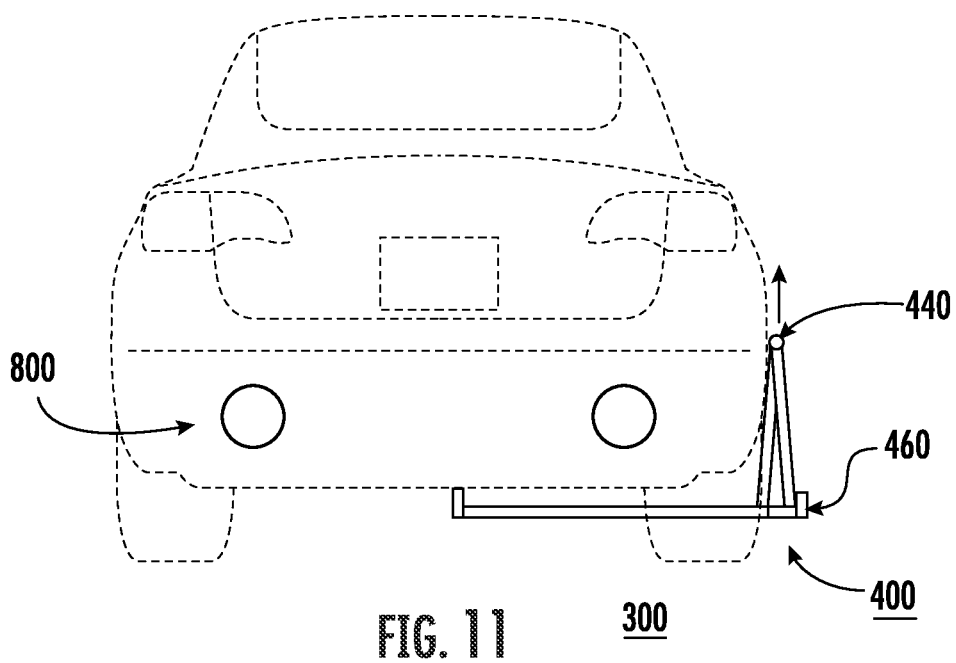
FIG. 11 is another rear view of a deployed vehicle external side protector in accordance with an embodiment of the invention.
Figure 12:
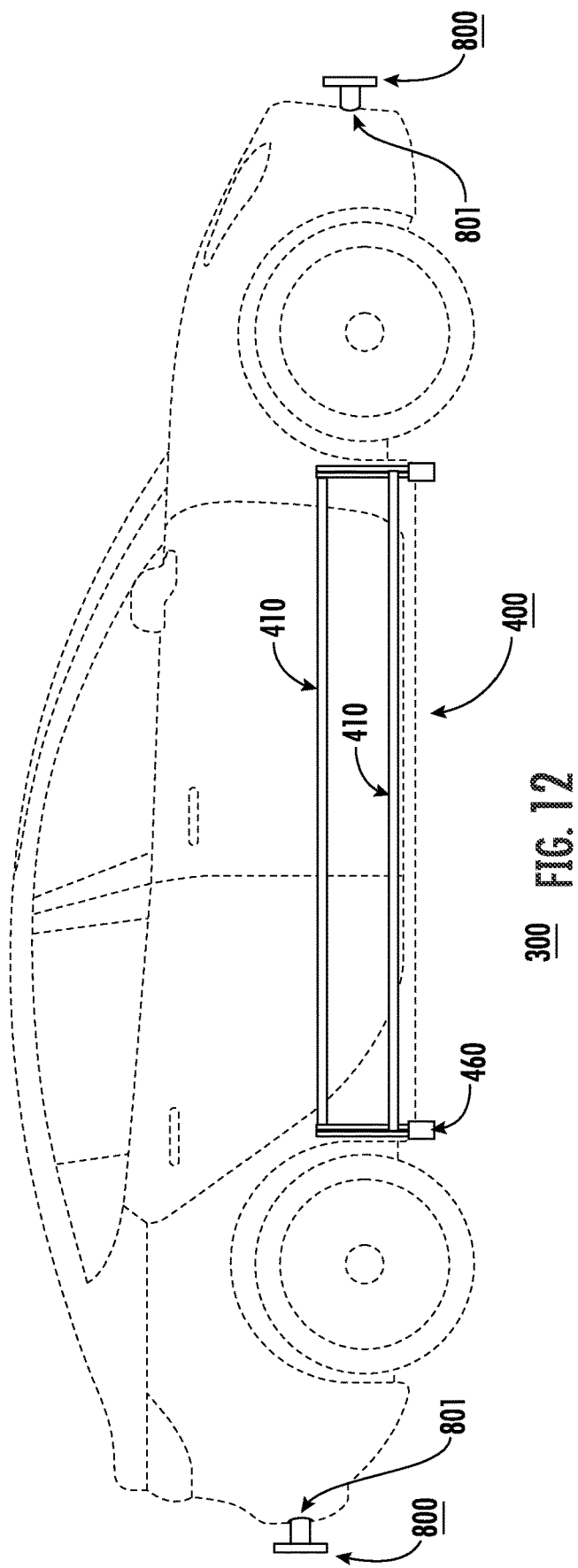
FIG. 12 is a side view of a deployed vehicle external side protector and deployed front and back vehicle side protectors in accordance with an embodiment of the invention.
Figure 13:
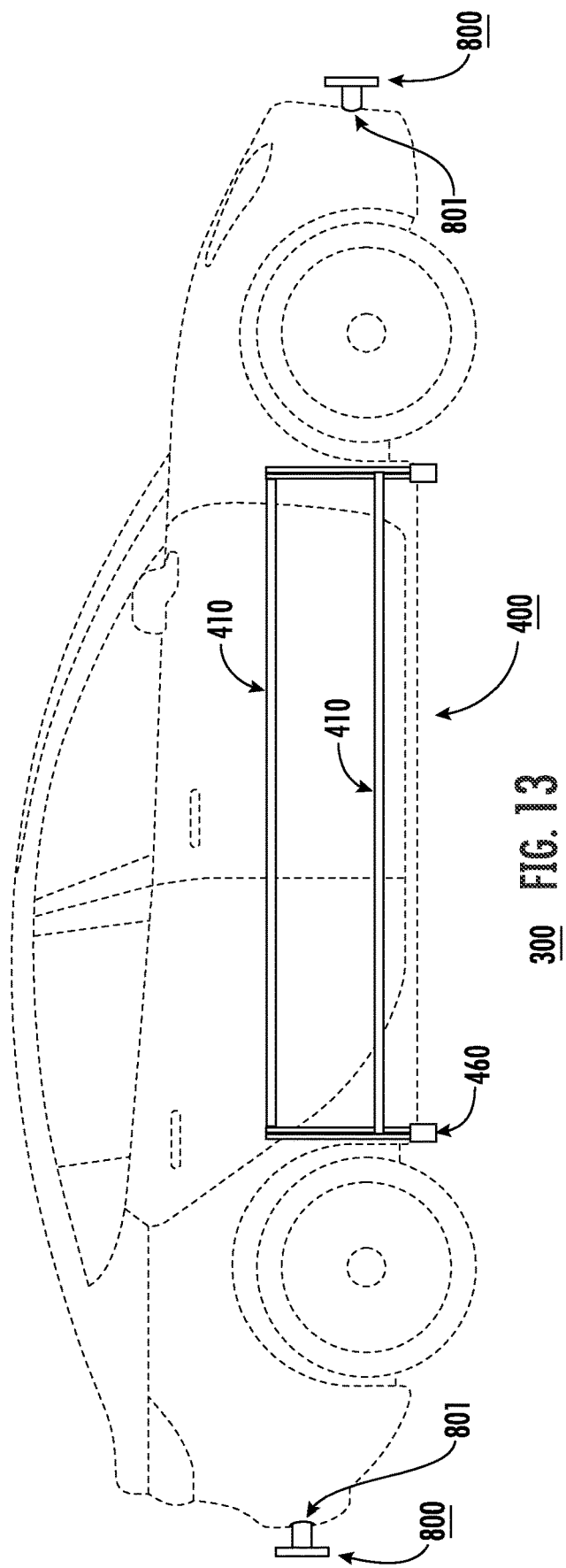
FIG. 13 is another side view of a deployed vehicle external side protector in accordance with an embodiment of the invention.
Figure 14:
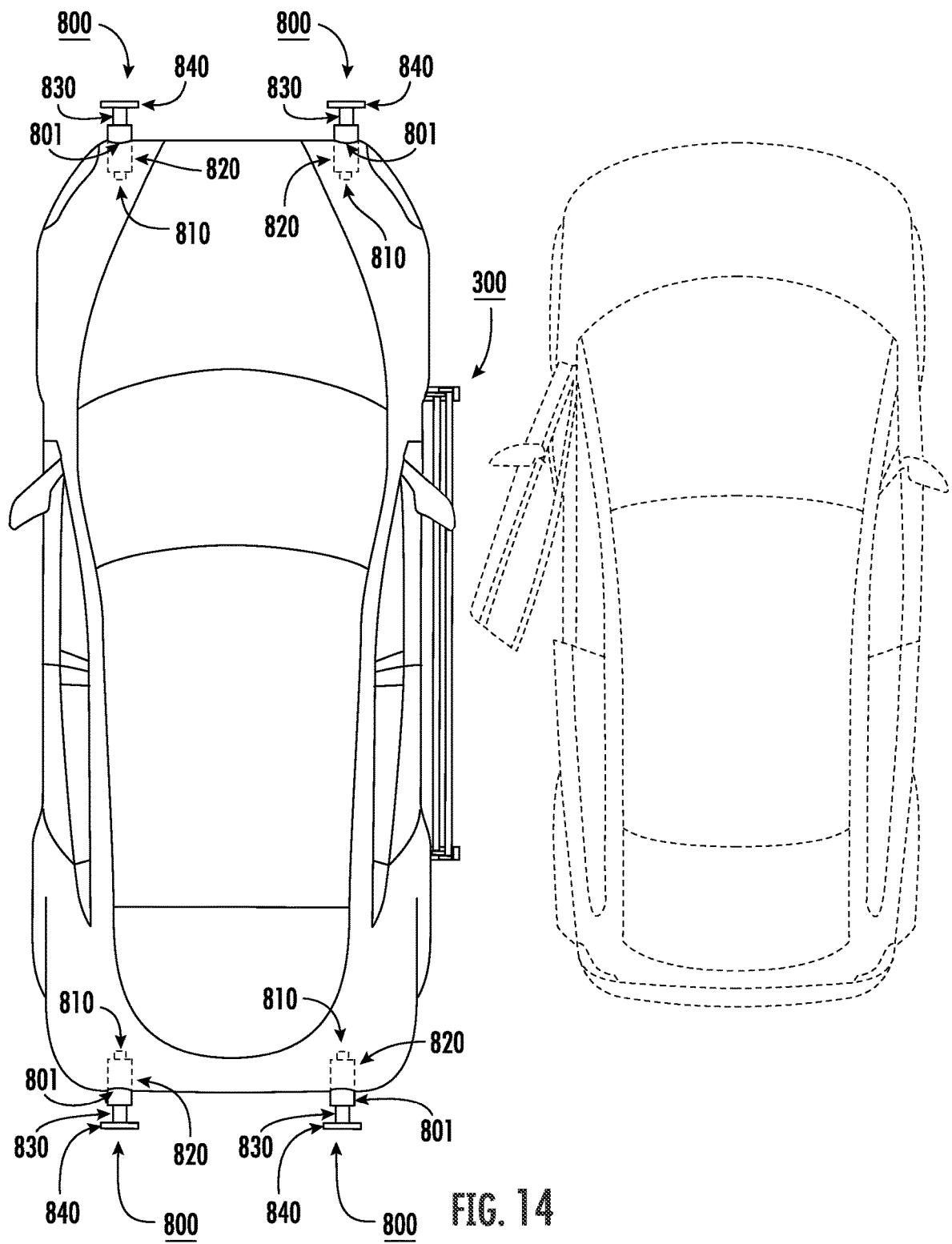
FIG. 14 is a top view of a deployed vehicle external side, front, and back protectors in accordance with an embodiment of the invention.
Figure 15:
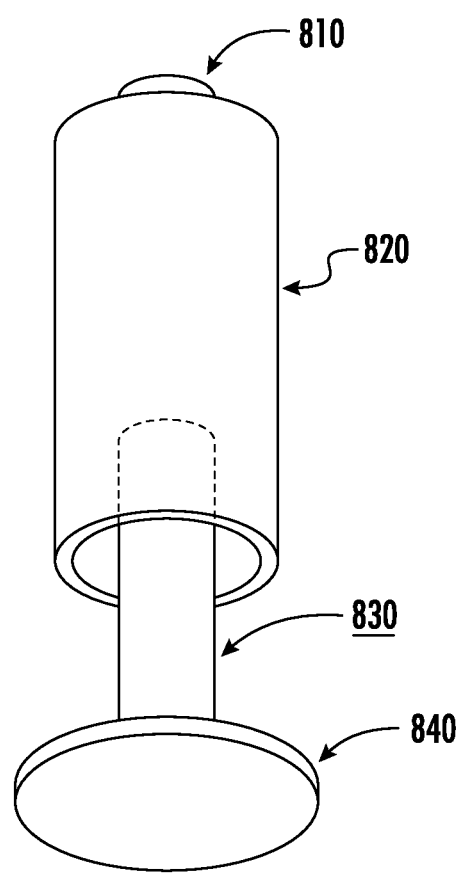
FIG. 15 is schematic of a vehicle external front or back protector in accordance with an embodiment of the invention.
Figure 16:
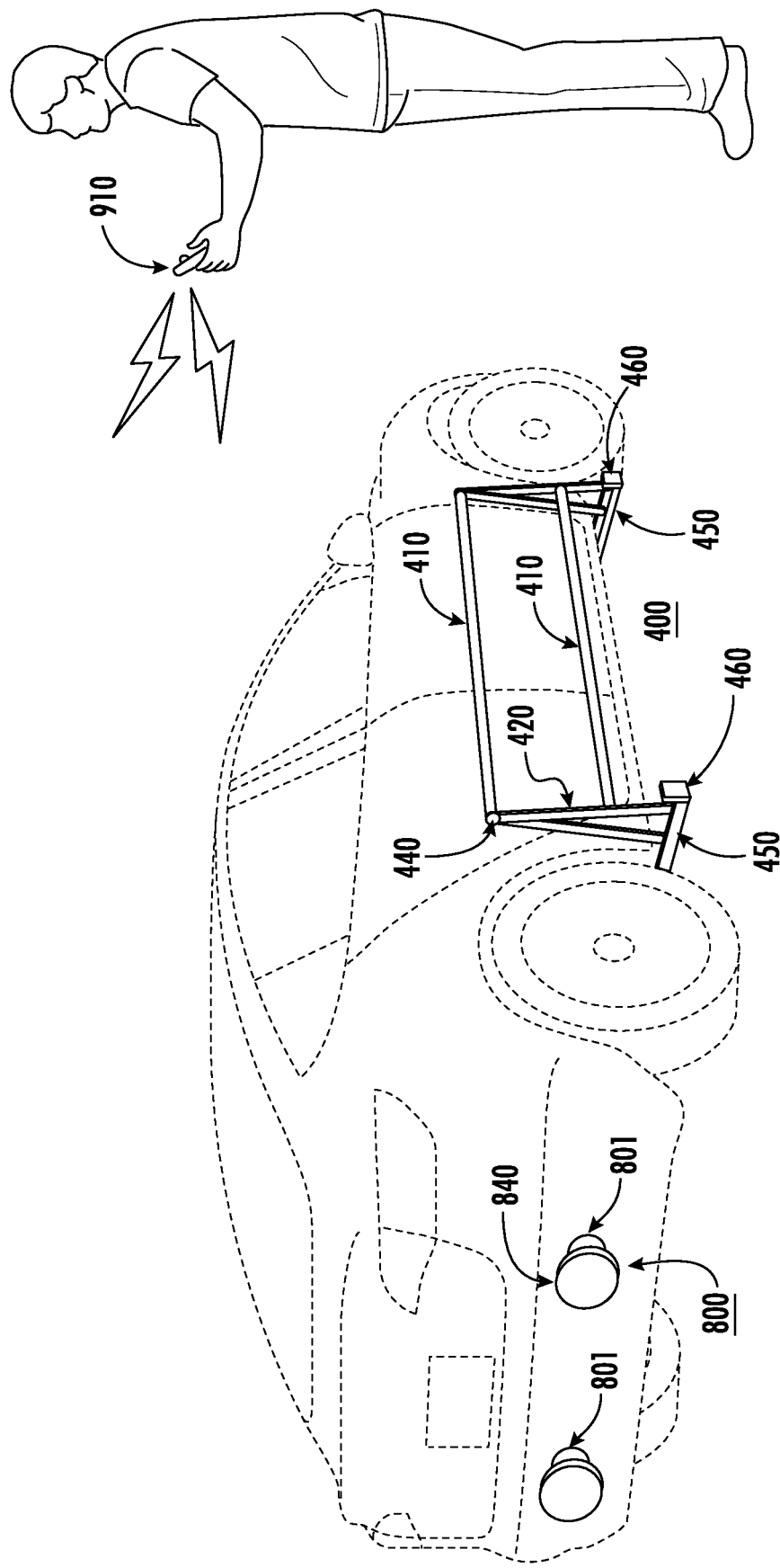
FIG. 16 is perspective view of a deploying a vehicle external side, front, and back protector with a remote in accordance with an embodiment of the invention.

Embodiments of the vehicle protection systems 300 which may include a vehicle external side protector 400 is shown in FIGS. 3-13. FIG. 5A is a schematic of a vehicle external side protector 400 in accordance with an embodiment of the invention; and FIG. 4 is a side view of a deploying vehicle external side protector 400 in accordance with an embodiment of the invention. As shown in FIGS. 4 and 5 (FIGS. 5A and 5B), the vehicle external side protector 400 may have 1 more vertically moveable guards 420. The vertically moveable guard 420 may be bendable at a position 440 or the vertically moveable guard 420 may comprise 2-pieces and connected by a pivot at position 440 as shown in FIGS. 5-7. The 2 piece vertically moveable guards may be in the shape of a bar or rod such as for illustration and not limitation. The 2 or more vertically moveable guards may have one or more connecting guards 410 connected to and stretching between each vertically moveable guard. The position of the vertically moveable guard 420 may be fixed or may be allowed to be positioned by a user along the length of the vertically moveable guards. For example, in some embodiments, the vertically moveable guards 420 may have a track on the deployment side, wherein the connecting guard 410 can be attached independently to each vertically moveable guard 420 (e.g., with a nut, screw, or wingnut) dimensioned to provide the requisite force to attach the connecting guard to the vertically moveable guards. In some embodiments, the connecting guard comprises a tapered hole on each side in for such removable attachment to occur. In some embodiments, the connecting guard is parallel to the ground. In some embodiments, the connecting guard is angled with the ground. The length of the connecting guard 410 is less than the distance from the outer perimeter of a front wheel to the outer perimeter of a back wheel of a vehicle side. With this dimension, the vehicle external side protector 400 is able to deploy and retract from underneath the vehicle. Furthermore, the external side protector 400 can be stored underneath the vehicle in parallel plane to the vehicle's undercarriage as shown in FIG. 8.

As shown in FIGS. 5A and 5B, the vehicle external side protector may be connected to one or more linear force applicators (e.g., actuators 430). The vehicle external side protector 400 may rests on a track 450 with an end point block 460 as shown, for example, in FIGS. 4-7. Each vertically moveable guard may independently rest on a track attached to the undercarriage of the vehicle in a storage position as shown in FIG. 5A. During deployment, the track may be extended from underneath the vehicle such that the end point blocks 460 extend past the periphery of the frame of the vehicle as can be seen in FIG. 4 and FIG. 5B. Such extension may occur by positioning the tracks, independently in a housing which allows their movement if a force is applied thereto. The force may be applied to the tracks by, for example a linear force applicator (e.g., attached to the undercarriage and/or housing) which causes the track to move into the position. To deploy the vertically moveable guards 420, a linear force may be applied to the vertically moveable guard on the side of the pivot opposite from the end point block. The linear force applicator typically applies a force parallel to the track. As the vertically moveable guard contacts the end point end block 460, the normal force of the end point block on the vertically moveable guard causes the vertically moveable guard to pivot (e.g., at position 440) and the vertically moveable guard will extend upward as can be seen in FIGS. 5A, 5B, 6, and 10. The linear force applicator typically applies a force, directly (e.g., the linear force applicator applies the force directly to the 2-piece vertical guard) or indirectly (e.g., the linear force applicator applies the force to another piece in contact the 2-piece vertical guard such as a force bar connecting at least two of the 2-piece vertical guards), to the 2-piece vertical guard. The linear force applicator may also supply a force to cause the track to move from the underside of the vehicle. In some embodiments, a second force applicator applies a force to the track to cause the movement of the tracks from the underside of the vehicle. Upon reaching the endpoint in the track, the pivot (and each portion of the 2-piece vertical guard connected thereto) may begin to fold up. This movement may occur because the force (e.g., normal force) from the endpoint onto the portion of the 2-piece vertical guard in contact with the endpoint and the force from the linear actuator on the other portion of the 2-piece vertical guard (e.g., the piece on the other side of the pivot) are applied in opposite or nearly opposite directions which may drive up the 2-piece vertical guard at the pivot and result in folding or bending one or more of the 2-piece vertical guards into a protective position. Following expansion upward, a portion of the track may be brought back under the under the car to allow for further vertically moveable guard pivoting and extension upward. This can be seen in a comparison of FIGS. 6 and 7 and a comparison of FIGS. 10 and 11. In some embodiments, each vertically moveable guard is attached to an actuation bar. The linear force applicator may apply the force to the actuation bar in order to induce this movement from all vertically moveable guards attached to the actuation bar simultaneously. In some embodiments, the linear for applicator that extends and retracts the track is the same as the linear force applicator that moves the vertically moveable guards. In some embodiments, the linear force applicator that extends and retracts the track (e.g., a first linear force applicator) is different from the linear force applicator that moves the vertically moveable guard (e.g., a second linear force applicator). In its fully deployed form, the vertically moveable guard may, for example, extend upwards.

Generally, the linear force applicator is able to provide a linear force to the track and/or the vertically moveable guards (e.g., via an actuation bar). For example, the linear force applicator may be independently selected from the group consisting of a hydraulic cylinder, a gas charged hydraulic cylinder, a pneumatic cylinder, a linear actuator, a machine screw linear actuator, a ball and screw linear actuator, and a roller screw linear actuator. The linear force applicator may be powered, by, for example, a battery. In some embodiments, the linear force applicator may be powered by a connection to the automobile power supply.

Non-limiting embodiment of the invention of the vehicle external side protectors include the following. FIG. 5C shows another view of a vehicle external side protector 400 in accordance with an embodiment of the invention with multiple actuators to deploy the side protectors. FIG. 5D is another view vehicle external side protector 400 in accordance with an embodiment of the invention showing the plurality of vertically movable bars 420 may have same or differing heights from each other. FIG. 5E is another embodiment of a vehicle external side protector in accordance with the invention with numerous vertically movable guards numerous connecting guards to form or be a solid sheet or plane that deploys and tracks as above. FIG. 5F is another embodiment of a vehicle external side protector in accordance with the invention with 2 or more vertically moveable guards 420 and 2 more connecting guards forming a criss-cross shape that deploys and tracks as above.

Furthermore, a vertically movable guard may be perpendicular to a connecting guard or other angle orientation as desired such as a criss-cross manner (e.g., where at least two connecting guards, each connected to at least two 2-piece vertical guards are angled such that they connecting guards cross one another when deployed as shown in FIG. 5F. Also, when there are a plurality of vertically movable guards, the plurality of vertically moveable guards can be oriented parallel or perpendicular to each other (e.g., one guard being oriented at −45° and the other guard being oriented at 45°) or have a relative angled orientation as desired. Any connecting guards may be able to expand and/or contract as the vertical guards deploy such as in embodiments where the vertical guards are non-parallel. Furthermore, when there are a plurality of connecting guards, each of the plurality of connecting guards can be parallel or perpendicular to each other or angle orientation as desired.

FIG. 6 is a perspective view of a deployed vehicle external side protector in accordance with an embodiment of the invention where the track is extended; and FIG. 7 is another perspective view of a deployed vehicle external side protector in accordance with an embodiment of the invention where the vertically moveable guards have extended vertically and the track has been retracted to the underside of the vehicle. As shown in FIGS. 3, 4, 6-7, 12-13, and 16, the length of the vehicle external side protector 400 is typically less than the distance from the outer perimeter of a front wheel to the outer perimeter of a back wheel of a vehicle side to deploy and retract from underneath the vehicle and be stored underneath the vehicle in parallel plane to the vehicle's undercarriage. In some embodiments, the system comprises two sets of vehicle external side protectors 400, one of the passenger side, and one on the driver side. In some embodiments, the system comprises one vehicle external side protector 400 that protects, for example, the passenger side.

In an embodiment, the vehicle external side protector has 2 or more vertically moveable guards 420 bendable at a position 440 as shown in FIG. 5-7; and the vertically moveable guards 420 have a height from bottom of wheel to desired height up the vehicle as shown in FIGS. 6 and 7 perspective views of a deployed vehicle external side protector in accordance with an embodiment of the invention. The "desired height" may be set, for example, by the length of the vertically moveable guards, where the pivot is typically at about half the length to allow for a symmetric deployment of the vertically moveable guards. Additionally, the "desired height" may be controlled by the amount of track extension from the undercarriage of the vehicle. In an embodiment, the vehicle external side protector has 2 or more vertically moveable guards 420 wherein the vertically moveable guard is in 2-pieces connected by a pivot mechanism at position 440 as shown in FIGS. 5-7; and the vertically moveable guards 420 have a height from bottom of wheel to desired height up the vehicle as shown in FIGS. 6 and 7 perspective views of a deployed vehicle external side protector in accordance with an embodiment of the invention. In an embodiment, the vehicle external side protector has 3 vertically moveable guards. The plurality of 2-piece vertically moveable guards may differ from each in height or material or be same or approximately the same (e.g., within 10% by length of one another). One or more connecting guards 410 typically stretches or extends between the vertically moveable guards (e.g., from the first to the second vertically moveable guard). In an embodiment, the vehicle external side protector has a plurality of connecting guards as shown FIGS. 3-13.

The vehicle external side protector may rest on a track 450 and is typically stored underneath the vehicle in parallel plane to the vehicle's undercarriage. The vehicle external side protector 400 may have a length less than the minimum distance from the outer perimeter of a front wheel to the outer perimeter of back wheel of a vehicle side to allow for clearance to deploy and retract from underneath the vehicle. The track may have a length that is less than the width of the vehicle base, such that the track may be stored entirely under the undercarriage of the car when in the storage position. Typically, one or more actuators 430 are affixed to the vehicle external side protector to horizontally deploy the vehicle external side protector from underneath the vehicle along the track 450 pushing the end of the vertically moveable guard towards an endpoint block 460. As shown in FIGS. 5A and 5B, the continued exerted push to the end block when/after reaching the limit of horizontal movement makes the pivot in the vertically moveable guard at position 440 connecting the 2 piece vertically moveable guards fold upwards to a desired length. As shown FIGS. 3-4 and 6-13, the 2-piece vertically moveable guards may fold up like an upside down U or V with both ends of the 2-piece vertically moveable guards on the ground.

By operating the linear force applicator in reverse (e.g., by pulling either the track under the undercarriage and/or the vertically moveable guard back into the track), by, for example, transmitting a signal, the protector may reversibly folds down the 2 piece-lever connected vertically moveable guards from the vehicle top towards the bottom until back to same horizontal plane in the track; and the horizontal vehicle external side protector horizontally retracts to underneath the vehicle in parallel plane to the vehicle's undercarriage. In an embodiment, the vehicle external side protector deploys with 2 movements (following expansion of the track from beneath the undercarriage):

1. horizontal—the vehicle external side protector may deploys horizontally from underneath the vehicle along the track pushing towards an endpoint block; and
2. the vertically moveable guards may then deploy upward to form an upside down U or V—after reaching horizontal limit afforded by the endpoint block, the continued push makes levers connecting the 2 piece vertically moveable guards fold up the 2-piece vertically moveable guards in an upward upside down U or V—direction from bottom of the vehicle toward the vehicle top up to desired length.

In some embodiments, methods are provided comprising:
a) expanding the track from beneath the undercarriage of the car by application of a linear force thereto; and/or
b) moving the vertically moveable guards into a protecting position (e.g., a position where the vertically moveable guard extends vertically) by applying a linear force to at least one vertically moveable guard such that the normal force with the endpoint induce the pivot to move upwards; and/or
c) retracting the track back under the undercarriage of the automobile to further extend the vertical bar upwards.

Retraction and storage from a protecting position may occur by operating the system in reverse. For example, the vehicle external side protector may retract with the 2 movements in reverse:

1. Downward—a signal reversibly folds down the 2 piece-lever connected vertically moveable guards from the vehicle top towards the bottom until back to horizontal; and 2. Horizontal—the vehicle external side protector then horizontally retracts to underneath the vehicle in parallel plane to the vehicle's undercarriage.

In some embodiments, the method may comprise:
a) lowering the lever by extending the track out of the vehicle undercarriage; and/or
b) providing a linear force to the vertically moveable guard to lower the lever into the track; and/or
c) retracting the track back under the undercarriage of the vehicle.

Figure 2:
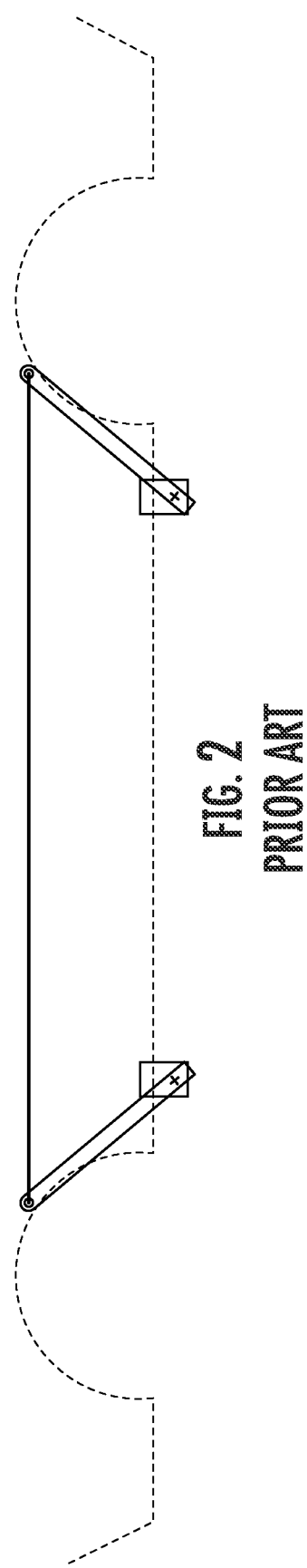
FIG. 2 is another schematic of a conventional vehicle protection apparatus.
Figure 3:
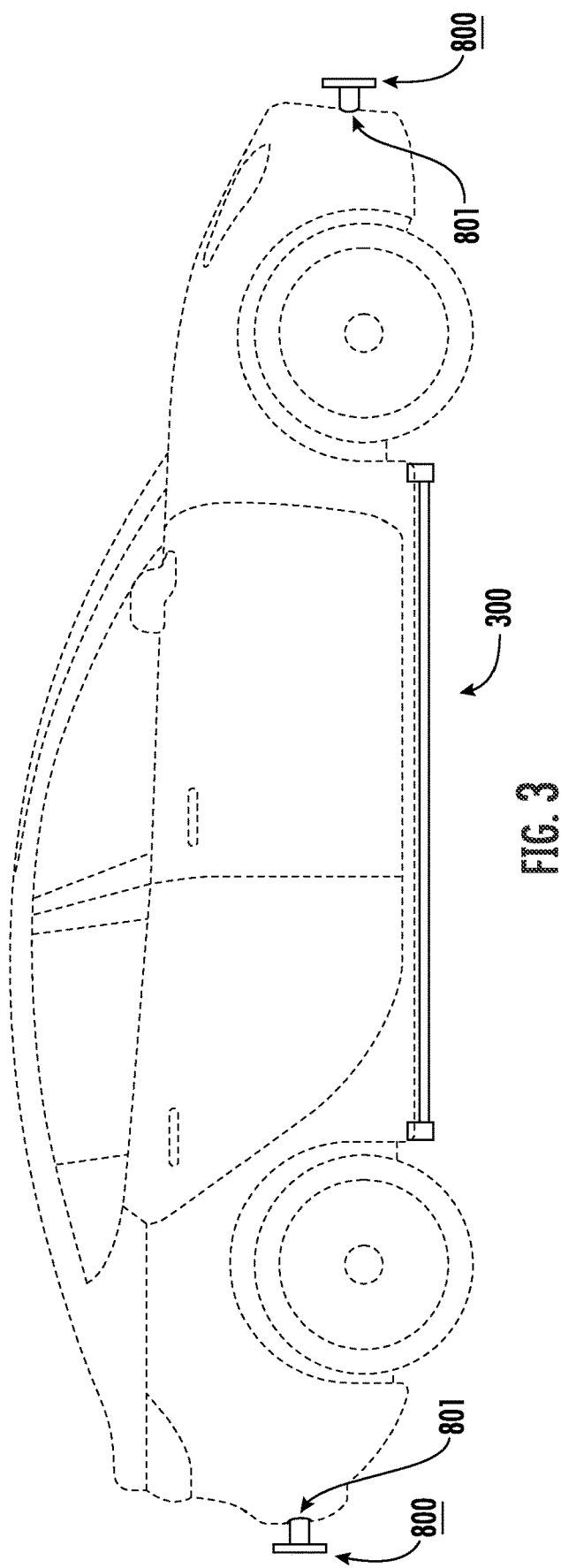
FIG. 3 is a side view of a retracted vehicle external side protector in accordance with an embodiment of the invention.

For illustration and not limitation, embodiments of the invention for vehicle external protection are compared to conventional vehicle protection apparatuses. As depicted in FIG. 1, a conventional vehicle protection apparatus requires manually attaching and removing the door protectors. Furthermore, such a convention vehicle protection apparatus just protects the side of a vehicle, not all perimeters front back and side of a vehicle from contact. Another conventional vehicle protection apparatus, as depicted in FIG. 2, includes just or only a single horizontal deployable narrow width of tension cable that blocks objects that may inadvertently approach and dent the vehicle door.

In contrast, embodiment of the invention for vehicle external side protector 400 is automatically deployable and retractable thereby saving much wasted time manually attaching and removing door protectors of conventional systems (FIG. 1), and especially in rainy cold weather, snowstorms, etc. Furthermore, the automatically deployable and retractable vehicle external side protector 400 is more strongly connected to the vehicle making it less vulnerable to theft compared to conventional manually attachable and removable peelable or strappable door protectors and bumpers which can easily be peeled, or straps cut. Additionally, embodiments of the deployable and retractable vehicle external side protector 400 of this invention protect more surface area of the vehicle than a conventional single horizontal narrow width of tension cable and not leaving most door surface area vulnerable; and is also capable of blocking or stopping contact with heavy objects of more strength than a tension cable. Thus, advantages of the vehicle external side protector 400 may also include stronger better protection against impact and for longer duration and for more surface area while also better protection against theft compared to a conventional narrow width tension cables and manual attachable and removable door and bumper protectors which can readily be peeled and cut.

In an embodiment, the vehicle external side protector 400 is configured to protect a larger surface area of a vehicle exterior side and against strong objects compared to a single horizontal tension cable. In another embodiment, the vehicle external side protector 400 is configured to protect a substantially larger surface area of a vehicle exterior side and against strong objects compared to a single horizontal tension cable such as by a plurality of connecting guards 410 and plurality of vertically moveable guards in a crisscross fashion as in FIG. 5D. In yet another embodiment, the vehicle external side protector 400 is configured to protect a portion of a plurality of vehicle door exteriors. In a particular embodiment, the vehicle external side protector 400 is configured to protect a substantial portion of a plurality of vehicle door exteriors.

It should be appreciated that embodiments of the vehicle external side protector 400 is not limited by the shape, size, form or type of material and includes vehicle external side protectors of various shape, size and form to protect the side, front or back of various range, type, and size of vehicles. Non-limiting examples of vehicles include trucks, cars, SUVS, buses, trains, motorcycles, etc. Dimensions of the protectors be made accommodating for any of these vehicles. The connecting guard 410 and vertically moveable guards 420 of the vehicle external side protector are depicted as rectangular strip like shape for illustration and not limitation. It should be appreciated the connecting guard 410 and vertically moveable guards 420 of vehicle external side protector is also not limited by the shape, size, form or type of material and includes connecting guard 410 and vertically moveable guards 420 of various shape, size and form to protect the side, front or back of various size, type, and range of vehicles such as trucks, cars, SUVS, buses, trains, motorcycles, etc. As vehicles are generally different, the invention is not restricted by size and shape of the connecting guard 410 and vertically moveable guards 420, angles of deployment, etc. unless expressly stated otherwise. In an embodiment, vertically moveable guards 420 have a diameter from about 1 to about 2 inches. In an embodiment, particularly those for protectors of smaller cars such as sedans, vertically moveable guards 420 have a height from about 4 to about 10 inches or 6 to 36 inches (e.g., the vertically moveable guard has a total length of from about 8 inches to 20 inches and, when deployed will have a maximum height of from about 4 to about 10 inches). In another embodiment, the vertically moveable guard has a total length of from about 6 inches to 36 inches, and when deployed will have a maximum height of from about 3 to about 18 inches. In some embodiments, the vehicle side protector reaches halfway to a height of a vehicle; hence, the length or height may be adjusted according to the size of the vehicle. In an embodiment of the vehicle side protector, the vertically moveable guard comprises a rod having a major longitudinal axis split in two pieces with a pivot. In another embodiment of the vehicle side protector, the vertically moveable guards and connecting guards form a rectangular cross section as shown in FIG. 5F.

In an embodiment, the vehicle external side protector has a plurality of vertically moveable guards 420. In a particular embodiment, the plurality of vertically moveable guards 420 have the same or similar (e.g., within 10%) dimensions. In another embodiment, the plurality of vertically moveable guards 420 differ from each other in one or more dimensions and/or in shape (e.g., rectangular cross section, ovoid or circular cross section). The vertically moveable guards 420 may have various characteristics. In an embodiment, the vertically moveable guards 420 includes rubber, metal, durable polymer, polyurethane, fiberglass, and foam, either individually or a combination of two or more thereof. In an embodiment, the connecting guard 410 has coating over at least some portion of the surface. In another embodiment, the vertically moveable guards 420 has coating over at least some portion of the surface. In another embodiment, the connecting guard 410 and vertically moveable guards 420 have coating over at least some portion of the surface. In an embodiment, the connecting guard 410 has a plurality of coatings such as a hard coating and/or a scratch resistant coating. In some embodiments, the coating is ceramic. In some embodiments, the coating is an anodizing coating. In another embodiment, the vertically moveable guards 420 has a plurality of coatings. In an embodiment, the connecting guard 410 and vertically moveable guards 420 have a plurality of coatings. In a particular embodiment, the plurality of coatings are the same. In another embodiment, the plurality of coatings from each other. The coatings may have various characteristics. In a particular embodiment, the connecting guard 410 and vertically moveable guards 420 includes (or is composed of) metal. In a particular embodiment, the connecting guard 410 and vertically moveable guards 420 includes (or is composed of) metal, rubber, fiberglass and durable polymer, either individually or a combination of two or more thereof. In yet another embodiment, the connecting guard 410 and vertically moveable guards 420 include, such as but not limited to, Ce, Fe, Mg, Al, Pt, Pd, Zr, Cu, Ba, Sr, Zn, Ca, Ni, Co, Mn, Cr, Mo, W, Ag, Cd, Bi, Sb, Dy, Er, Eu, Gd, Ge, Au, Ho, Ir, La, Pb, Mn, Nd, Nb, Os, Pr, Pm, Re, Rh, Ru, Sm, Sc, Se, Si, S, Ta, Te, Tb, Sn, Ti, W, Tm, either individually or in a combination of two or more thereof. In particular embodiments, the connecting guards and/or vertical bars includes or are composed of aluminum. In an embodiment, the connecting guard 410 and vertically moveable guards 420 includes steel such as stainless steel.

It is understood the invention includes protecting outer surface of both sides of the vehicle, from and back as desired and provided for by the user.

An embodiment of the invention includes a vehicle external front or back protector 800 as shown in FIGS. 3-4 and 6-16. A vehicle front or back protector comprises: a linear force applicator having a housing, and piston in the housing attached to the linear force applicator, wherein the linear force applicator is configured to linearly move the piston; and a plate. The plate has a larger outer surface perimeter than the outermost surface perimeter of the piston, wherein the plate is affixed to the portion of the piston furthest from the linear force applicator. The linear force applicator (e.g., actuator) moves the piston to extend the plate a distance away from the bumper or front and retracts the piston and plate to the opening; and the front or back vehicle protector is capable of being connected to a vehicle's front or back.

The orifice may be made into the body of the car, such as in the bumper. The orifice may include one or more linear force applicators such as actuator 810 having a housing 820, and one or more pistons 830 in the housing. A plate 840 with a larger outer surface perimeter than the outermost surface perimeter of the piston is affixed to the external outermost surface perimeter of the piston. The actuator may deploy and retract the piston and retract such that the piston and plate attached thereto may be moved remains outside of the orifice and provide protection to the body of the vehicle.

In an embodiment, the vehicle external back protector includes a back of the vehicle having one or more orifices 801. The orifice includes one or more actuators 810 having a housing 820, and one or more pistons 830 in the housing. A plate 840 with a larger outer surface perimeter than the outermost surface perimeter of the piston is affixed to the external outermost surface perimeter of the piston; wherein one or more actuators 810 deploy the piston and retracts the piston up to the plate 840 (e.g., metal plate) which remains outside of the orifice. The plate may be dimensioned to match the opening of the orifice, such that when the plate is retracted, it matches the contours of the original vehicle body shape.

It is understood that embodiments of the invention include metal plates of various shapes, form, and sizes such as but not limited to circles, rectangles, ovals or any other polygon etc. and is not limited in shape, form, and size. In an embodiment, for illustration not limitation, the metal plate is shown in similar to circular form. In an embodiment, the piston has a diameter from about 2 to about 6 inches. In another embodiment, the plate has a diameter from about 3 to about 6 inches. In yet an embodiment, the piston, when deployed, extends from about 4 to about 10 inches from the surface of the vehicle body.

In a particular embodiment, the vehicle external front and back protector are the same. In another embodiment, the vehicle external front and back protector differ from each other. In an embodiment, the 840 plate of the vehicle external front or back protector includes (or is composed of)

metal. In an embodiment, the plate includes steel such as stainless steel. In an embodiment, the plate includes Ce, Fe, Mg, Al, Pt, Pd, Zr, Cu, Ba, Sr, Zn, Ca, Ni, Co, Mn, Cr, Mo, W, Ag, Cd, Bi, Sb, Dy, Er, Eu, Gd, Ge, Au, Ho, Ir, La, Pb, Mn, Nd, Nb, Os, Pr, Pm, Re, Rh, Ru, Sm, Sc, Se, Si, S, Ta, Te, Tb, Sn, Ti, W, Tm, either individually or in a combination of two or more thereof. In an embodiment, the plate includes metal. In an embodiment, the plate includes steel. In an embodiment, the plate includes Ce, Fe, Mg, Al, Pt, Pd, Zr, Cu, Ba, Sr, Zn, Ca, Ni, Co, Mn, Cr, Mo, W, Ag, Cd, Bi, Sb, Dy, Er, Eu, Gd, Ge, Au, Ho, Ir, La, Pb, Mn, Nd, Nb, Os, Pr, Pm, Re, Rh, Ru, Sm, Sc, Se, Si, S, Ta, Te, Tb, Sn, Ti, W, Tm, either individually or in a combination of two or more thereof. In an embodiment, the 840 plate of the vehicle external front or back protector includes carbon fiber, rubber, plastics or other suitable materials, either individually or in combinations of 2 or more thereof. In various implementations, the plate may have a coating such as an anti-reflection, anti-static, anodic, anti-scratch, or toughening coating.

An embodiment of the invention provides a vehicle external protection system. In an embodiment, the vehicle external protection system includes a vehicle external side protector, vehicle external front protector, or vehicle external back protector in combinations of two or more thereof.

The vehicle external side, front and back protectors may respectively and individually be deployed or retracted using a transmitter that is in communication with one or more of the linear force applicators. For example, the transmitter may transmit deploy or retract signals such as electromagnetic signals. The transmitter may include modes such as deploy and/or storage which fully deploy or store any of the protectors, respectively. In some embodiments, such as piston expansion from the front/back protectors, track expansion, and vertical protector raising and lowering may be individually adjusted using the transmitter. In some embodiments, deploying and retraction may occur using electrical signals which also control the power locks of the vehicle or by remote, either individually in a combination of 2 or more thereof. In an embodiment, the vehicle external side, front and back protectors are respectively and selectively deployed or retracted using the same electrical signals which control the power locks of a vehicle. In another embodiment, the vehicle external side, front and back protectors are respectively and selectively deployed or retracted with different electrical signals which control the power locks of a vehicle. In an embodiment, a vehicle may be protected by one or multiple vehicle protectors such as vehicle external side, front and back protectors which are controlled by one or more remote devices. In a particular embodiment, the vehicle external side, front and back protectors are respectively and selectively deployed or retracted by the same remote. In a particular embodiment, the vehicle external side, front and back protectors are respectively and selectively deployed or retracted by different remotes. In an embodiment, a single remote control independently selectively or jointly deploy or retract the multiple vehicle protectors protecting multiple sides of the vehicle, such as side, front and back of a vehicle. In another embodiment, a plurality of remotes independently or jointly deploy or retract the multiple vehicle protectors protecting multiple sides of the vehicle, such as side, front and back of a vehicle.

Embodiments of the invention include vehicle protectors, such as the side, front and back, that can be deployed using either a dedicated remote control for the protection system or by using the same remote widely used for locking and unlocking vehicle doors, trunks, or setting anti-theft alarm systems. In an embodiment, the vehicle protectors include one or more detectors; and the vehicle protectors may be deployed or be retracted upon receipt of a signal from a remote-control device to one or more of the detectors. The deployment of the vehicle protectors is triggered by an electronic signal from the remote control to the linear force applicator (e.g., actuators) such as described above.

The vehicle external side, front and back protectors respectively may fully deploy to protect the vehicle when it is parked and locked with all doors closed and locked. Upon receipt of a signal that a door has become unlocked, the vehicle external side, front and back protectors respectively reverse the deployment process and retract to its stored condition. The vehicle external side, front and back protectors may be programmed to seek electronic indicator signals from the vehicle that it is in "Park" and that all the vehicle doors are closed and locked. In some embodiments, the system interfaces with the external proximity sensors of an automobile to evaluate the tolerances for expansion and retraction of various components with respect to nearby obstacles.

In an embodiment, a vehicle protector, such as external side, front and back protector, further includes one or more sensor devices. In an embodiment, a vehicle protector includes a plurality of sensor devices. In another embodiment, a plurality of vehicle protectors includes a plurality of sensor devices. In a particular embodiment, the plurality of sensor devices 210 are the same. In another embodiment, the plurality of sensor devices differ from each other. The sensor devices may have various characteristics. The invention is not limited by the shape, size, form or type of the sensor devices.

In an embodiment, the vehicle external side, front and back protector respectively includes one or more sensor devices along a side, both sides, front, or back of the vehicle, either individually or combinations of two or more thereof, to detect the presence of a threat to the vehicle within a predefined perimeter. Alternatively, a single wide-angle detector that is capable of detecting threats across a section or entire perimeter of the vehicle may be used. The sensor devices may be used to determine if an object like a shopping cart or another vehicle is within a predefined proximity to the protected vehicle using ultrasonic detectors or other proximity sensor devices. In operation, a vehicle enhanced with such embodiment of the vehicle external side, front and back protectors of the present invention may be parked without the protectors already deployed; and if an object like a shopping cart or another vehicle parks with the pre-defined proximity, the sensor devices may detect the nearing object or other vehicle and automatically deploy on one or more threatened sides of the vehicle, front, and back of the vehicle, either individually or in combinations of 2 or more. It should be appreciated that embodiments of the invention include a vehicle having a plurality of vehicle protectors such as vehicle external side, front and back protectors with one or more sensor devices protecting the doors, front, and back of a vehicle that can selectively be deployed and retracted.

Non-limiting ways embodiments of the invention are new and inventive compared to convention vehicle protection apparatus include as described below. Some advantages of embodiments of the invention compared to convention vehicle protection apparatus include as described below; but embodiments of the invention are not limited by such.

Approximating language, as used herein throughout the specification and claims, may be applied to modify any quantitative or qualitative representation that could permissibly vary without resulting in a change in the basic function to which it is related. Accordingly, a value modified by a term such as "about" or numerical ranges is not to be limited to a specified precise value and may include values that differ from the specified value within a tolerance understood for the measurement being approximated. In at least some instances, the approximating language may correspond to the precision of an instrument for measuring the value. Any use of "about" may be considered to explicitly embrace the indicated endpoints.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

While the invention has been described in detail in connection with only a limited number of aspects, it should be understood that the invention is not limited to such disclosed aspects. Rather, the invention can be modified to incorporate any number of variations, alterations, substitutions, or equivalent arrangements not heretofore described, but which are commensurate with the scope of the claims. Additionally, while various embodiments of the invention have been described, it is to be understood that aspects of the invention may include only some of the described embodiments. Accordingly, the invention is not to be seen as limited by the foregoing description but is only limited by the scope of the appended claims.

What is claimed is:

1. A vehicle external side protector comprising:
   two vertically moveable guards each comprising two pieces capable of pivoting relative to one another;
   a pivot mechanism connecting the two pieces of each vertically moveable guard;
   a connecting guard connecting the two vertically moveable guards;
   a track for each vertically moveable guard dimensioned to be stored underneath a vehicle and able to slide out from underneath the vehicle, wherein each track comprises an endpoint block;
   a linear force applicator configured to apply a force to the vertically moveable guards in the tracks, wherein the force deploys the vertically moveable guards from underneath the vehicle along the track by pushing the vertically moveable guards in the tracks in a first direction towards and into the endpoint blocks, wherein the force from the endpoint blocks on the vertical guards causes the two pieces thereof to upwardly fold up from the bottom of the vehicle toward the vehicle top into a protective configuration;
   wherein the linear force applicator also applies a force in the opposite direction of the first direction to the vertically moveable guards to fold down the vertical guards from the protective position until the vertical guards are back in the tracks in a horizontal position; and the vertically moveable guards retract to underneath the vehicle in parallel plane to the vehicle's undercarriage in a storage configuration.

2. The vehicle external side protector of claim 1, wherein a vehicle is protected by a plurality of vehicle external side protectors.

3. The vehicle external side protector of claim 2, wherein the plurality of vehicle external side protectors are independently selectively or jointly deployed or retracted to protect multiple sides of the vehicle.

4. The vehicle external side protector of claim 1, wherein the vehicle external side protector is configured and dimensioned to protect a portion of a vehicle side.

5. The vehicle external side protector of claim 1, wherein the vehicle external side protector is configured and dimensioned to protect a substantial portion of a vehicle side.

6. The vehicle external side protector of claim 1, wherein the vehicle external side protector comprises metal, rubber, polyurethane, fiberglass, and foam metal, rubber, and durable polymer, either individually or in a combination of two or more thereof.

7. The vehicle external side protector of claim 6, wherein the vehicle external side protector comprises metal.

8. The vehicle external side protector of claim 6, wherein the vehicle external side proctor comprises foam.

9. The vehicle external side protector of claim 1, wherein the connecting guard comprises metal.

10. The vehicle external side protector of claim 1, wherein each vertically moveable guard comprises metal.

11. The vehicle external side protector of claim 1, wherein the vehicle external side protector has a coating over at least some portion of its surface.

12. The vehicle external side protector of claim 1, wherein the vehicle external side protector has a coating over a substantial portion of its surface.

13. The vehicle external side protector of claim 1, wherein the vehicle external side protector has a coating over at least some portion of its surface.

14. The vehicle external side protector of claim 1, wherein the connecting guard has a coating over at least some portion of its surface.

15. The vehicle external side protector of claim 1, wherein the connecting guard has a coating over substantial portion of its surface.

16. The vehicle external side protector of claim 1, wherein deployment of the side protector is triggered by an electronic signal sent to the linear force applicator.

17. The vehicle external side protector of claim 1, wherein each vertically moveable guard comprises a rod having a major longitudinal axis split in two pieces with a pivot and wherein the vertically movable guards and connecting guards have a rectangular cross section.

18. A vehicle front or back protector comprising:
   a linear force applicator having a housing, and a piston with an outermost surface perimeter in the housing attached to the linear force applicator, wherein the linear force applicator is configured to linearly move the piston, and the housing is attached in an orifice of a bumper of the vehicle; and
   a plate with a larger outer surface perimeter than the outermost surface perimeter of the piston, wherein the plate is affixed to a portion of the piston furthest from the linear force applicator;
   wherein the linear force applicator moves the piston to extend the plate a distance away from the bumper and retracts the piston and plate to the orifice.

19. A system for protecting a vehicle comprising:
   a. a vehicle external side protector comprising:
   two vertically moveable guards each comprising two pieces capable of pivoting relative to one another;
   a pivot mechanism connecting the two pieces of the vertically moveable guard at the pivot;
   a connecting guard connecting the two vertically moveable guards;
   a track for each vertically moveable guard, which is dimensioned to be stored underneath a vehicle, wherein each track comprises an endpoint block and wherein the track can slide from underneath the vehicle to the exterior of the vehicle;

a linear force applicator, wherein the linear force applicator applies a linear force to the vertically moveable guards in the tracks, wherein the force deploys the vehicle external side protector from underneath the vehicle along the track by pushing the vertically moveable guards in the track in a first direction towards and into the endpoint block, wherein the normal force of the endpoint block causes the vertically moveable guards and the pivot to fold up from the bottom of the vehicle toward the vehicle top; and/or b. a vehicle front or back protector comprising a bumper of the vehicle having an orifice with an opening; wherein the orifice comprises:

a linear force applicator having a housing, and a piston with an outermost surface perimeter in the housing attached to the linear force applicator, wherein the linear force applicator is able to linearly move the piston; and a plate with a larger outer surface perimeter than the outermost surface perimeter of the piston, wherein the plate is affixed to a portion of the piston furthest from the linear force applicator;

wherein the linear force applicator moves the piston to extend the plate a distance away from the bumper and retracts the piston and plate to the opening.

20. The system of claim 19, where the system comprises the vehicle external side protector and wherein the vertically moveable guard comprises a rod having a major longitudinal axis split in two pieces with a pivot; and wherein the vertically moveable guards and connecting guard has a rectangular cross section.

* * * * *